（12） United States Patent
Yutkowitz

(10) Patent No.: US 6,961,628 B2
(45) Date of Patent: Nov. 1, 2005

(54) METHOD AND APPARATUS FOR TUNING COMPENSATION PARAMETERS

(75) Inventor: Stephen J. Yutkowitz, West Chester, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 314 days.

(21) Appl. No.: 10/017,021

(22) Filed: Dec. 14, 2001

(65) Prior Publication Data

US 2002/0156541 A1 Oct. 24, 2002

Related U.S. Application Data

(63) Continuation-in-part of application No. 09/293,096, filed on Apr. 16, 1999, now Pat. No. 6,470,225.

(51) Int. Cl.[7] .............................................. G05B 13/02
(52) U.S. Cl. ................................ 700/37; 38/39; 38/44
(58) Field of Search ...................... 700/37–39, 44–45, 700/28, 32, 54, 56, 61, 63, 65, 67, 69, 231, 260; 318/571; 382/280

(56) References Cited

U.S. PATENT DOCUMENTS

| | | | | |
|---|---|---|---|---|
| 3,798,430 A | * | 3/1974 | Simon et al. ................ 318/571 |
| 4,623,971 A | * | 11/1986 | Ailman et al. ............... 700/252 |
| 4,714,988 A | * | 12/1987 | Hiroi et al. .................... 700/45 |
| 4,817,176 A | * | 3/1989 | Marshall et al. ............. 382/280 |
| 4,988,935 A | * | 1/1991 | York ....................... 318/568.18 |
| 5,029,143 A | * | 7/1991 | McCracken et al. ........... 367/1 |
| 5,285,378 A | * | 2/1994 | Matsumoto ................... 700/37 |
| 5,587,896 A | * | 12/1996 | Hansen et al. ................. 700/28 |
| 5,684,374 A | * | 11/1997 | Chaffee ....................... 318/616 |
| 5,684,375 A | * | 11/1997 | Chaffee et al. ............. 318/638 |
| 5,946,449 A | * | 8/1999 | Dickerson et al. .......... 700/260 |
| 6,128,541 A | * | 10/2000 | Junk ............................. 700/39 |
| 6,307,443 B1 | * | 10/2001 | Gabara ....................... 333/17.1 |
| 6,445,962 B1 | * | 9/2002 | Blevins et al. ................ 700/37 |
| 6,519,860 B1 | * | 2/2003 | Bieg et al. .................... 33/503 |
| 6,564,121 B1 | * | 5/2003 | Wallace et al. ............. 700/231 |
| 6,604,211 B1 | * | 8/2003 | Heiman et al. ............... 714/41 |
| 6,631,299 B1 | * | 10/2003 | Patel et al. ................... 700/37 |
| 6,658,370 B2 | * | 12/2003 | Christ et al. ................ 702/182 |
| 2003/0045949 A1 | * | 3/2003 | Stone et al. .................. 700/61 |

FOREIGN PATENT DOCUMENTS

JP 08006644 A * 1/1996 ............ G05D/3/12

OTHER PUBLICATIONS

Lee, D. and YannaKakis, M., Principles and methods of testing finite state machines–a survey, Aug. 1996, Proceedings of the IEEE, vol. 84 Issue 8, 1090–1123.*

* cited by examiner

*Primary Examiner*—Anthony Knight
*Assistant Examiner*—Ronald D. Hartman, Jr.

(57) ABSTRACT

A method and apparatus for tuning a feedforward compensation parameter in a motion control system is provided. According to one such embodiment, the method includes the acts of determining an initial value of a feedforward compensation parameter and commanding an initial movement of an actuator according to a test motion routine (wherein the initial value of the parameter is used in the control of the actuator). Error associated with the initial movement is determined. A potential value of the feedforward compensation parameter is determined. A movement of the actuator is commanded according to the test motion routine (wherein the potential value of the parameter is used in the control of the actuator) and error associated with the movement is determined. The errors associated with the movements are compared and, based on the act of comparing the errors, one of the values is selected as a current best value. In a further embodiment, such acts are repeated until the current best value is an optimum value.

17 Claims, 14 Drawing Sheets

Example of Velocity Command Profile of Excitation Part Program $T_V = 2T_{A1} + 4T_J$

METHOD AND APPARATUS FOR TUNING COMPENSATION PARAMETERS

This application is a continuation-in-part of application Ser. No. 09/293,096, which was filed on Apr. 16, 1999, now U.S. Pat. No. 6,470,225 the entire disclosure of which is hereby incorporated by reference.

TECHNICAL FIELD

The present invention relates to tuning compensation parameters in a motion control system, and, more particularly, in one embodiment, to a method and apparatus which iteratively tunes a parameter which compensates for time-shift relationships in a motion control system.

BACKGROUND OF THE INVENTION

Traditional machine tool position control systems are designed with feedback control in which "following error" (the difference between the actual and desired positions) produces a command which is delivered to a velocity control loop for driving an actuator connected to a movable member. The actuator and/or connected movable member are sometimes referred to as an "axis" of the machine tool or device having the movable member. In practice, it is difficult, if not impossible, to achieve zero following error during motion of the axis if only feedback control is utilized. Following errors generally do not cause a problem in the case of machining long linear spans, because the following error vector is along the desired straight line path, and, accordingly, the machine path follows the desired path. However, in the case of cut direction changes or in complex contouring, following errors can cause the machined path to deviate from the desired path resulting in a "contour error."

Typically, the magnitude of the contour error increases as the feedrate and/or path curvature increases. In addition to following errors, disturbance forces, such as Coulomb friction, may also cause the machine to deviate from the desired path.

Accordingly, "feedforward" control was developed to attempt to minimize following errors and errors caused by disturbance forces. Feedforward control attempts to minimize the following errors and to compensate "in advance" for the errors caused by known disturbance forces by anticipating the response of the machine tool system. The required information to allow feedforward to anticipate in advance is obtained by performing measurements of machine state variables while the machine undergoes various controlled movements, and/or a theoretical analysis from knowledge of system components, and geometries (e.g., system inertia). Feedforward compensation involves applying additional control signals, such as additional torque or velocity commands for example, based upon this knowledge of the system dynamics, rather than waiting for feedback errors to build up, as occurs in feedback control. Feedforward is used in addition to feedback, because feedback is still required to account for imperfections in the feedforward system model, and to counter unexpected forces, such as cutting forces.

It has been known that, for optimum performance, a number of feedforward compensations should be utilized. For example, a velocity feedforward compensation can be utilized to compensate for velocity feedback control dynamics, and an acceleration feedforward compensation can be utilized to compensate for inertial forces. In addition, a viscous friction feedforward compensation can be applied to compensate for viscous friction forces, a Coulomb friction feedforward compensation can be applied to compensate for Coulomb friction forces, and a constant offset feedforward compensation can be applied to compensate for gravitational forces. In discrete time systems (i.e. sampled data systems), the feedforward command values can be generated at each update interval. The feedforward command values can then be added to the velocity command and/or torque commands, and the servo can hold these signals constant over the update interval.

Previously, many feedforward compensation levels had to be determined manually. For example, to determine a Coulomb friction feedforward gain, the axis could be moved in a positive direction at a constant velocity and then moved in the negative direction at a constant velocity. Motor current measurements could be taken during these movements, and the measurements used to manually calculate a Coulomb friction feedforward gain. To determine an acceleration feedforward gain, the inertia level of each pertinent mechanical element in the system could be calculated individually, and the sum of these values used to determine an appropriate acceleration feedforward gain.

As can be understood, such manual calculations had a number of disadvantages. For example, manual tuning took a considerable amount of time, and often provided less than accurate estimates. Moreover, the manual tuning of feedforward gains required an engineer or technician with sufficient knowledge of the control system and the required calculations. In addition, there was not a reliable way of determining whether the model developed from the manual calculations accurately described the actual system dynamics. Furthermore, when test movements and measurements were used, such as when deriving a Coulomb friction gain, there was no way of determining whether the test sufficiently "excited" the axis by moving it through enough modes of operation (e.g., enough different velocities, accelerations, and position changes.) In addition, such manual testing procedures did not provide a way of automatically determining an optimum excitation program (i.e., test motion) for the axis based upon user-enterable operating parameters.

U.S. Pat. No. 5,684,375, which issued to Chaffee, discloses a method for tuning gains in electronic motion control systems. According to the patent, the motor is commanded through a single, unidirectional motion event for tuning these parameters. As disclosed in the patent, the event comprises driving the motor at a predetermined tuning torque level until the motor reaches a predetermined maximum velocity, and then decelerating the motor back to zero at the tuning torque level. FIG. 5 and FIG. 6 of Chaffee illustrate the control signals generated and the velocity profile of the motor during this tuning motion. During the motion, feedback signals from the motor are monitored and parameters, such as the electrical current applied to the motor, the velocity of the motor, and the acceleration and deceleration times are recorded. The patent discloses that a number of values can be calculated based upon the parameters measured and recorded, such as the effective inertia value $J_m$, the position feedback error proportional gain $K_{p(pos)}$, the velocity feedback error proportional gain $K_{p(vel)}$, the position feedback error integral gain $K_{i(pos)}$, and the velocity feedback error integral gain $K_{i(vel)}$. The feedforward gain $K_{ff}$, on the other hand, is apparently not tuned, as the patent discloses that it can be set either to unity or to zero, depending on whether feedforward is to be applied.

U.S. Pat. No. 5,159,254, which issued to Teshima, discloses a method of estimating mass, inertia, viscous friction coefficient, or sliding frictional force of a movable part in a machine, by using a spring mass system as a model for the dynamic characteristic of the movable part. According to the reference, the following equation is used to represent the relationship between $x_1$, (which indicates a value obtained by converting an angular value of a motor shaft into a traveling direction of the movable part), and $x_2$, (which indicates a position of the movable part):

$$K(x_2-x_1)=m\ddot{x}_2+c\dot{x}_2+fr (\text{if } \dot{x}_2>0)$$

$$K(x_2-x_1)=m\ddot{x}_2+c\dot{x}_2-fr (\text{if } \dot{x}_2>0)$$

where $\dot{x}_2$ is the velocity of the movable part, $\ddot{x}_2$ is the acceleration of the movable part, m is the mass, c is the viscous friction coefficient, and fr is the sliding frictional force of the movable part, respectively. These equations are then converted to an equation relating the motor current feedback value to the velocity and acceleration of the movable part, to obtain the mass m, viscous friction coefficient c, and Coulomb frictional force fr. The patent discloses that inertia is calculated by equation (4) of the reference which relates maximum current feedback value $I_{max}$ at the time of acceleration to the inertia $(J_I+J_M)$ The reference mentions that the mass, viscous friction coefficient, and sliding frictional force can then be used to automatically adjust the acceleration/deceleration time constants, the position feedback loop gain of the servo controller, for the purposes of avoiding motor current saturation. However, the derivation of feedforward parameters does not appear to be disclosed, nor does the reference disclose the computation of any confidence factors for indicating the accuracy of the derived parameters. Also, the reference does not appear to disclose the need for predetermined motion for computing the values, or any method of computing such a motion.

SUMMARY OF THE INVENTION

Accordingly, the present invention is directed to tuning compensation parameters in a motion control system.

In one embodiment, the invention is directed to a method for tuning a feedforward compensation parameter in a motion control system. According to one such embodiment, the method includes the acts of determining an initial value of a feedforward compensation parameter and commanding an initial movement of an actuator according to a test motion routine (wherein the initial value of the parameter is used in the control of the actuator). Error associated with the initial movement is determined.

A potential value of the feedforward compensation parameter is determined. A movement of the actuator is commanded according to the test motion routine (wherein the potential value of the parameter is used in the control of the actuator) and error associated with the movement is determined. The errors associated with the movements are compared and, based on the act of comparing the errors, one of the values is selected as a current best value. In a further embodiment, such acts are repeated until the current best value is an optimum value.

In another embodiment of the invention, a method for tuning a compensation parameter in a motion control system having an actuator is provided, wherein the motion control system utilizes a position command and a feedforward command to control motion of the actuator, and the compensation parameter compensates for time-shift relationships in the system. According to one such method, an initial value of the compensation parameter is determined and an initial movement of an actuator is commanded according to a test motion routine (wherein the initial value of the parameter is used in the control of the actuator). Error associated with the initial movement is determined.

A potential value of the parameter is determined. A movement of the actuator is commanded according to the test motion routine (wherein the potential value of the parameter is used in the control of the actuator). Error associated with the commanded movement is determined. The errors associated with the movements are compared and, based on the act of comparing the errors, one of the values is selected as a current best value. In a her embodiment, such acts are repeated until the current best value is an optimum value.

Yet another embodiment of the present invention relates to a motion control system. Such a motion control system might include a position command generator, a feedforward command generator, a controller, and a feedforward tuning unit. The position command generator can be adapted to produce position commands. The feedforward command generator can be adapted to produce feedforward commands based upon feedforward compensation parameters. One of the feedforward compensation parameters might include a time-shift compensation parameter that compensates for time-shift relationships in the system. The controller can be adapted to communicate with an actuator, the position command generator, and the feedforward command generator. In one embodiment of the present invention, the controller communicates via a data communication network and in compliance with a communications protocol. One exemplary communication protocol is a hypertext transfer protocol. The controller can also be adapted to control the motion of the actuator based upon the position commands and feedforward commands.

The feedforward tuning unit can be adapted to determine an initial value of the time-shift compensation parameter, cause the position command generator to produce position commands according to a test motion routine (wherein the initial value of the time-shift compensation parameter is used in the control of the actuator and the actuator undergoes an initial movement), and determine error associated with the initial movement. The feedforward tuning unit can also be adapted to determine a potential value of the time-shift compensation parameter, cause the position command generator to produce position commands according to the test motion routine (wherein the potential value of the time-shift compensation parameter is used in the control of the actuator and the actuator undergoes movement), determine error associated with the movement (wherein the potential value was used in the control of the actuator), compare the errors associated with the movements, select one of the values as a current best value based on the comparison, and, in a farther embodiment, repeat these actions until the current best value is an optimum value.

These and additional advantages and novel features of the present invention will become apparent to those skilled in the art from the following detailed description, which is simply, by way of illustration, various modes contemplated for carrying out the invention. As will be realized, the invention is capable of other different aspects, all without departing from the invention. Accordingly, the specification is intended to be illustrative in nature and not restrictive.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF EXEMPLARY EMBODIMENTS

I. Exemplary Embodiment of Feedforward Control System

A. Continuous Time Model

Figure 1:
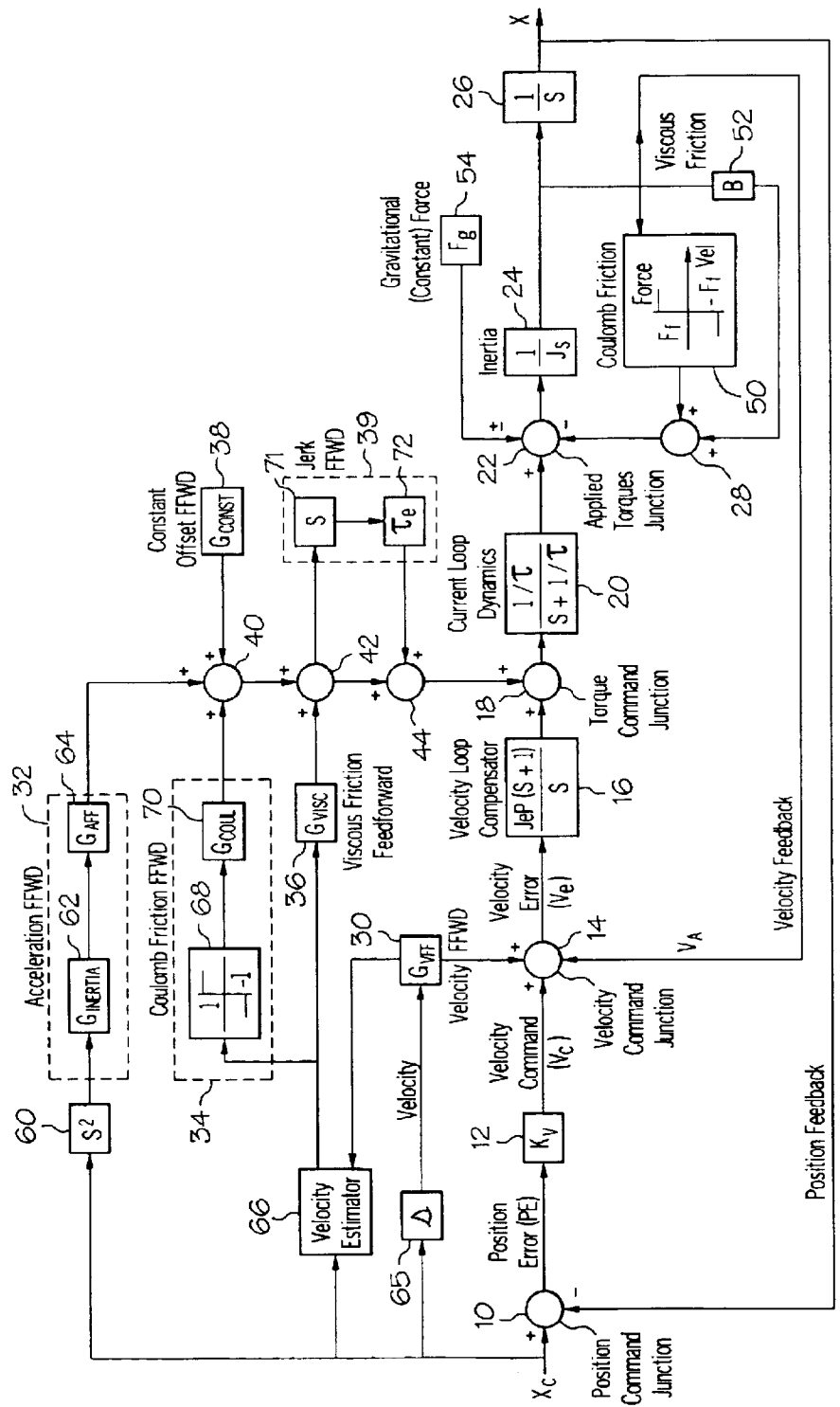
FIG. 1 is a control system block diagram illustrating an exemplary feedforward system, with which the tuning method of the present invention can be utilized.

Referring now to the drawings in detail, FIG. 1 is a block diagram illustrating a continuous time model of an exemplary integrated feedforward control system having feedforward gains which are automatically tuned, according to one aspect of the present invention. The figure illustrates an exemplary model for implementing feedforward to compensate for various system dynamics in a motion control system, where s in the figure represents differentiating, and 1/s represents integrating, as is known in the art. The model includes compensation for Coulomb and viscous friction, gravitational effects, and inertial effects. The model could be implemented using analog circuits, and, as can be understood, concepts which apply to this embodiment are discussed for further understanding of the invention, as these concepts may be applicable to other embodiments discussed herein. Also, it should be understood that while concepts are often discussed herein in the context of machine tool systems, as can be understood, they have application to a wide variety of motion control systems.

According to this embodiment, the position command $X_c$ is applied to a summing junction 10 where a position loop error $P_E$ is determined as the difference between the position command $X_c$ and the actual position X of the axis. The position loop error $P_E$ is multiplied by the position loop gain $K_v$, at block 12, in order to implement proportional gain of the position loop and to consequently produce a velocity command component $V_c$. Then, at summing junction 14, the velocity command is added with the output of a velocity feedforward function 30, and the actual velocity $V_A$ of the controlled element is subtracted to produce a velocity loop error $V_E$.

The velocity loop error $V_E$ is then used in a compensator function 16 to produce a torque command. The compensator function 16 utilizes an estimate of the total apparent inertia of the motor shaft, $J_e$, and the velocity loop proportional gain P to convert the velocity loop error $V_E$ to the torque command. The total apparent inertia $J_e$ is used so that the proportional gain P of the compensator 16 may be configured by the user in frequency units that designate the desired velocity loop bandwidth. As known in the art, the value for the estimated total apparent inertia $J_e$ can be manually configured based upon the configurations and properties of the various mechanical components in the system. Also, although it is desirable that the variable $J_e$ be separately configurable from the variable $G_{INERTIA}$ of block 62 for maximum flexibility of the feedforward system, the two could be set equal to the same value if desired, or the same variable could be used for both.

Then, at summing junction 18, the torque command is added to a number of feedforward compensation values to obtain a total torque command value. For example, the outputs of an acceleration feedforward function 32, a Coulomb friction feedforward function 34, and a constant offset feedforward function 38 are all added at summing junction 40. This sum is then added to a viscous friction feedforward function 36 at summing junction 42. A jerk feedforward function 39 is then added in at junction 44. The output of junction 44 is then added with the torque command at summing junction 18 to produce the feedforward-compensated total torque command. This total torque command is then fed to a current loop servo-controller which compares the actual motor current to the torque command and then produces a voltage command which creates the motor current via an amplifier. A model for the overall dynamics of this current loop controller is shown as block 20.

The resulting applied motor torque (i.e, the output of block 20) is opposed by a variety of forces on the machine. For example, as is shown in FIG. 1, Coulomb friction, the sign of which (i.e., either positive or negative) is dependent upon the direction of the motor velocity, opposes the applied motor torque. In addition, viscous friction also opposes the motor torque. These two phenomena are modeled as blocks 50 and 52 respectively, and the sum of the two (i.e, the output of junction 28) is subtracted from the motor torque at junction 22. In addition, depending on the direction that the axis is being moved, the force of gravity can either oppose or supplement the motor torque. This gravitation force is modeled as block 54 and is added or subtracted, as appropriate, with the applied motor torque at block 22.

The net torque produced by the motor (i.e., the output of junction 22) affects the acceleration achieved by the motor. In particular, dividing the net torque by the total apparent inertia at the motor shaft J, results in the acceleration which is achieved. Integrating this value then results in the motor velocity. This relationship between net motor torque and velocity is illustrated at block 24. Finally, the integration of the motor velocity provides the actual position X which is achieved by the axis. This relationship between motor velocity and motor position is illustrated at block 26. Blocks 22, 24, 26, 50, 52, and 54 represent a model of a system with simple dynamics, particularly one that does not contain any mechanical resonance effects. (It has been found, however, that the automatic tuning of the parameters, described below, is not adversely affected by the presence of mechanical resonance effects, even though the preferred feedforward system utilized does not provide compensation for these effects.)

As noted above, in this exemplary embodiment, five feedforward functions contribute a component to the total torque command. (The other feedforward, velocity feedforward, contributes to the velocity command). In particulars shown in FIG. 1, the acceleration feedforward function 32 takes the second derivative of the position command $X_c$, derived from block 60, and multiplies it by a feedforward inertia estimate $G_{INERTIA}$ of block 62 and an acceleration feedforward gain $G_{AFF}$ of block 64. Thus, the acceleration feedforward torque is preferably proportional to the acceleration of the position command $X_c$.

As is also shown in FIG. 1, the Coulomb friction feedforward 34 operates on a velocity estimate, from block 66, and determines the sign (positive or negative) of this estimate at block 68. (A method for determining a velocity estimate is disclosed in U.S. Pat. No. 5,170,498, the entire disclosure of which is hereby incorporated herein by reference.) Then, at block 70, this sign (+1 or −1) is multiplied by the Coulomb friction feedforward gain $G_{COUL}$ to obtain the Coulomb friction feedforward torque component to be used. Thus, Coulomb friction feedforward is preferably either a positive or negative constant, depending on the direction of the velocity.

In contrast, the viscous friction feedforward 36 is preferably proportional to the velocity estimate. In particular, the velocity estimate, from block 66, is multiplied by a viscous friction feedforward gain $G_{VISC}$ to obtain the viscous friction feedforward torque signal.

For the constant offset feedforward, a constant value $G_{CONST}$ is preferably utilized, as shown at block 38 of FIG. 1. Thus, the constant offset feedforward torque component is preferably a constant value which is applied regardless of the velocity or acceleration.

The fifth and final feedforward function which contributes to the torque command in the preferred embodiment of FIG. 1 is the "jerk" feedforward 39. The "jerk" feedforward function 39 is utilized to compensate for the current loop dynamics of block 20. The parameter $\tau_e$ of block 72 is an estimate of the servo-controller's torque loop time constant. This parameter is multiplied by the derivative of the sum of the four other feedforwards, from block 71, as shown in FIG. 1.

The effects of these five feedforwards in this exemplary system will now be examined. For illustration, if the current loop dynamics are temporarily ignored, then the "applied torque junction" 22 and the "torque command junction" 18 become equivalent, and the jerk feedforward can be disabled by setting the time-constant $\tau_e$ to zero. As can be understood from FIG. 1, in this scenario, if the viscous friction gain $G_{VISC}$ of the viscous friction feedforward function 36 matches the actual viscous friction B of block 52, and if the Coulomb friction gain $G_{COUL}$ of the Coulomb friction feedforward function 34 matches the actual Coulomb friction from block 50, then these two feedforward functions will compensate for the losses due to the actual viscous and Coulomb friction phenomena experienced. As can also be understood, if the constant offset gain $G_{CONST}$ of the constant offset feedforward function 38 exactly matches the gravitational force $F_g$, then the effect of gravity is compensated. Finally, if the estimated inertia $G_{INERTIA}$ is equivalent to the actual axis inertia J, and the acceleration feedforward gain $G_{aff}$ is 100%, then the acceleration feedforward function 32 will compensate for the actual inertia J of the system. In addition, if velocity feedforward is applied at a level of 100%, the velocity feedback is nulled such that the velocity compensator loop output is zero and the position is developed strictly from the torque feedforward. Accordingly, in these ideal circumstances, the transfer function from the commanded position $X_c$ and the actual position X is 1, and the effects of inertia, friction, and gravity are perfectly compensated.

However, because the current loop time constant is typically not zero in practice, the "applied torque junction" 22 is not equivalent to the "torque command junction" 18. This situation can be corrected by use of the "jerk feedforward" function 39, which essentially pre-filters the feedforward torque command with a filter which has the inverse dynamics of the current loop dynamics 20. The so-called "jerk feedforward" function 39 of FIG. 1 is equivalent to the inverse current loop dynamics pre-filter of equation (1) below. This model assumes that the closed current control loop (torque control) is reasonably modeled as a first order low pass filter.

$$(1 + 1\tau_e s) = \frac{\left(\dfrac{1}{\tau_e} + s\right)}{\dfrac{1}{\tau_e}} \tag{1}$$

However, it should be understand that jerk feedforward can be eliminated and good results still obtained. It is believed that this is so because the bandwidth of a typical current or torque control loop is normally relatively high (e.g., a bandwidth of around 400 Hertz is common). This frequency is well above the bandwidth of energy expected to be present in the position command signals and the derivatives thereof. Thus, the addition of jerk feedforward can become unrealizable in a digital system because the rate at which the feedforward is computed every major update interval is too low to accomplish pre-filtering to null the effect of the current loop.

The overall result is that, when feedforward is implemented as shown in the example of FIG. 1, and when the model parameters exactly match the actual system parameters, and if the velocity feedforward is 100% ($G_{VFF}$=1), then the output of the velocity loop compensator 16 is zero. In this case, the transfer function from the position command $X_c$ to the actual position X is H(s)=1. In practice, this is rarely, if ever, the case, because a real mechanical system contains multiple structural resonances in addition to many other dynamic effects such as complex frictional forces, disturbance forces, etc.

Thus, in order to maintain accuracy of the exemplary system of FIG. 1, it is important to avoid exciting resonances. Resonant modes can be easily excited if the position command signal contains a substantial amount of high frequency energy. For this reason, it is important that, when feedforward is applied, that the position command signals $X_c$ be as smooth as possible. In order to accomplish this, it may be necessary to set the interpolator's parameters for acceleration, jerk, and step velocity configuration parameters to values which are substantially lower than those values which work well in a non-feedforward environment. (As is known in the art, the step velocity configuration parameter limits the amount of step change which is permitted in an axis' velocity defined by a sequence of axis position commands, while the acceleration and jerk configuration parameters set maximum allowable values for the second and third derivative of the position command time sequence.)

According to one aspect of the present invention, a number of the feedforward gain values can be automatically tuned, as discussed in further detail below in Section II. These gains include the $G_{COUL}$ of block 70, $G_{VISC}$ of block 36, $G_{CONST}$ of block 38, and $G_{INERTIA}$ of block 62. However, it is contemplated that other feedforward gains could be equally tuned by the present invention, and that the present invention could be utilized with a variety of feedforward systems, having a variety of configurations and implementations. Accordingly, the feedforward systems described herein, and the parameters thereof which are tuned, should be regarded as illustrative rather than restrictive in nature.

B. Discrete Time Model

The above-discussion of FIG. 1 relates to a system with an analog or continuous-time controller. It was shown that feedforward is able to compensate for the dynamics of an input-output system whose mechanical aspects are described by a single inertia and friction. The implementation of feedforward on a digital controller typically requires a discrete-time design, because the control action is discrete-time. In such an implementation, the feedforward command signals can be sent to the digital servo controller via the velocity command and torque command inputs. Then, the digital servo can hold these signals constant over the major update interval, such as what is referred to in the art as a "BPI" (basic process interval) for example, which is defined by the position command updates.

In a discrete time implementation, the system diagram of FIG. 1 is generally applicable, except that differentiation (i.e., the s terms of FIG. 1) needs to be approximated, such as by the backward difference method, and, as discussed in further detail below, the model can be transferred to the "z-domain" where z-domain equations are utilized. The actual equations used can be difference equations which include terms to account for axis error compensation, scaling, gear range, inertia adjust, acceleration feedback, and the like.

Equation (2) below shows a preferred backward difference method for computing velocity feedforward, where T is the major update interval time (e.g., 3 milliseconds, 5 milliseconds), $z^{-1}$ is a backward shift by one update T, $X_c(z)$ is the position command, $G_{VFF}$ is the velocity feedforward gain (where 1=100%), and Vff(z) is the velocity feedforward command.

$$V_{FF}(z) = G_{VFF} \frac{1 - z^{-1}}{T} X_C(z) \qquad (2)$$

This equation can be used with conventional and digital servo-controllers to provide the velocity feedforward as a component of the velocity command. However, it should be understood that other methods of obtaining similar results could be utilized as well.

A backwards difference method can also be used for obtaining acceleration feedforward. In one embodiment, the acceleration feedforward command can then be implemented as a torque command and determined by multiplying this acceleration by the inertia estimate $G_{INERTIA}$ and the acceleration feedforward gain $G_{AFF}$, such as is shown below as equation (3):

$$Tc_{AFF}(z) = G_{AFF} G_{INERTIA} \frac{(1 - z^{-1})^2}{T^2} X_C(z) \qquad (3)$$

As discussed above, Coulomb friction is a constant force which opposes motion. The Coulomb friction is a positive constant for positive velocities, a negative constant for negative velocities, and is discontinuous at zero velocities. Thus, the model used in this preferred embodiment assumes that the Coulomb friction forces acting on the axis during negative velocity motion are equal and opposite to the Coulomb forces acting on the axis during positive velocity motion. In particular, a positive gain is added to the torque command for positive velocities, and a negative gain added to the torque command for negative velocities.

The sign of the velocity of the position command could be used to determine if $+G_{COUL}$ should be applied or if $-G_{COUL}$ should be applied as the Coulomb friction feedforward. However, in certain situations, it may be desirable that velocity and acceleration feedforward are temporarily disabled, while Coulomb friction feedforward is still desired. In such situations, the sensed velocity of the axis will lag the derivative (i.e., velocity) of the position command signal. However, the step change in Coulomb friction feedforward should take place at the instant when the axis actually reverses direction and not when the velocity of the position command signal reverses.

Accordingly, a velocity estimator can be used to produce an accurate estimate of the actual axis velocity (and, thus, to estimate the moment when the axis actually reverses direction). One preferred z-domain equation for the axis velocity estimator is shown below as equation (4):

$$V_{est}(z) = \frac{K_v z^{-1}(1 - z^{-1})}{1 - (1 - K_v T)z^{-1}} X_c(z) + \frac{(1 - z^{-1})}{1 - (1 - K_v T)z^{-1}} V_{ff}(z) \qquad (4)$$

The Coulomb friction feedforward value can then be determined by multiplying the Coulomb friction feedforward gain $G_{COUL}$ by the sign (positive or negative) of the velocity estimate at the current (k'th) interval update. Accordingly, an equation such as the following can be utilized to calculate the Coulomb friction feedforward as a torque command:

$$Tc_{coul}(k) = G_{coul} \text{sign}(V_{est}(k)) \qquad (5)$$

In the actual implementation, it has been found that it is useful to add a small amount of hysteresis to the sign function to prevent inappropriate instantaneous change in friction feedforward level.

Viscous friction feedforward can be implemented in discrete time as a torque command which is proportional to the estimate of the axis velocity. In particular, the estimate can be multiplied by the viscous friction feedforward gain $G_{VISC}$. Accordingly, the axis velocity estimate discussed above (equation (4)) can also be used for viscous friction feedforward in discrete time. In particular, the following equation shows a preferred way to calculate the viscous friction feedforward torque command component, which counters frictional forces which are approximately linearly proportional to axis velocity:

$$Tc_{visc}(z)=G_{visc}V_{est}(z) \quad (6)$$

Constant offset feedforward is used to counteract torques imposed by gravitational forces and counter balances. Normally, the integrator in the velocity loop would counteract the constant offset. However, when certain types of non-linear feedback, such as integrator gain scheduling, are implemented, it can be beneficial to feedforward the constant offset torque. Constant offset feedforward allows the integrator's nominal value to be near zero rather than at some level required to counteract the offset torque. The constant offset feedforward is preferably set equal to a constant, $G_{CONST}$, (the constant offset feedforward gain), according to the following equation:

$$Tc_{const}(z)=G_{const} \quad (7)$$

It has been found that jerk feedforward partially negates the low pass nature of the current control loop, and works best when the current control loop is approximated by a first order low pass filter. Jerk feedforward computes the first derivative of the sum of the torque commands (the sum of the outputs of the acceleration feedforward function, the Coulomb friction feedforward function, the viscous friction feedforward function, and the constant offset feedforward function). Even though "jerk" is actually the first derivative of acceleration, the term "jerk feedforward" is used because a large portion of the sum of the torques comprises the first derivative of the acceleration feedforward.

Jerk feedforward can be implemented in discrete time by applying the discrete equivalent of the term ($\tau s+1$) to the sum of the torque feedforward components. The term $\tau$ is the time constant of the first order approximation of the current control loop. In such an implementation, the jerk feedforward takes the sum of the individual components of the torque command and applies a backward difference discrete time equivalent filter to the inverse of the first order model of the servo's torque control loop:

$$Tc(z)=(1+\tau/T(1-z^{-1}))(Tc_{visc}(z)+Tc_{coul}(z)+Tc_{AFE}(z)) \quad (8)$$

It has also been found that care should be taken when applying jerk feedforward because it can increase the level of high frequency energy in the torque command signal and make excitation of mechanical resonances more likely. Accordingly, the jerk feedforward can be disabled by setting $\tau$ equal to zero, and it can later be enabled in special cases where it is found to be beneficial.

II. Automatic Tuning of the Feedforward Gains

According to one aspect of the present invention, several of the feedforward gains, discussed above with respect to the continuous and discrete time model, can be determined by processing data acquired while moving or testing a machine axis using an automatically generated part program. As discussed in further detail below, the excitation part program preferably moves the axis being tuned back and forth at various feedrates and generates a data acquisition file for the axis, the file including velocity feedback data and motor torque command data. (The term "feedrate" refers to the velocity of the point of interest, and is the vector sum of the velocities of the various axes moving this point. If only one axis moves the point, the feedrate is equal to the velocity for this axis.)

The excitation program, also referred to as the "test program" or "test motion routine," can be generated automatically based upon parameters provided by the user, according to one aspect of the invention, as described in detail below. The acquired data can then be analyzed by an automatic tuning algorithm which determines an optimum set of feedforward gain parameters based upon the measurements taken. Capability is also provided for determining how well the derived parameters correlate with the actual machine tool system, as well as for determining how well the test program "excited" the axis. "Excitation" is the degree to which the motion causes each aspect of the axis dynamics to be present.

A. The Preferred Automatic Tuning Algorithm

1. The Equations for the Model

In the preferred embodiment, the auto-tuning algorithm estimates the feedforward parameters for an axis by using an input-output model that is meant to represent the behavior of the axis drive mechanisms. The model comprises a system whose input is the motor shaft velocity and whose output is the motor torque command. The model assumes that the torque delivered by the motor is equivalent to the torque command. In practice, there will typically be some dynamic mismatch between the torque command and the motor torque, but this approximation is expected to be reasonable for the purposes of obtaining feedforward parameters because the frequencies associated with torque control are much higher than those described by the parameters of the model. The dynamics model preferably accounts for the following effects (these effects could equally apply to linear motion axes, rotary motion axes, ballscrew and rack-and-pinion mechanical motion components, angular and linear velocities, and other system particulars, as can be understood).

- Inertia—the total apparent inertia of the axis as seen at the motor shaft. It can be expressed in rotary units of Kg-meter$^2$ (N–M-Sec$^2$). For a linear axis, the inertia can include the contributions of the motor, coupling, ballscrew, and linear mass.
- Viscous Friction—the torque opposing the motion which is proportional to the velocity. It is sometimes associated with some type of fluid motion e.g. greased bearings, although its effects can be present in many types of systems. Viscous friction can be expressed in rotary units: N–M/rpm.
- Coulomb Friction—the constant friction force opposing the motion. The Coulomb friction can be expressed in motor-torque units of N–M.
- Constant Offset—the component of the torque which is always applied independent of the motion. It can be caused by gravity, counterbalances, direction dependent Coulomb friction, tilting of the machine, for example. It can be expressed in units of N–M.

Once these values are found by using the automatic tuning method, they can then be used to derive the optimum feedforward gains to be used, $G_{AFF}$, $G_{VISC}$, $G_{COUL}$, and $G_{CONST}$, which are described above.

The tuning algorithm for the axis preferably utilizes Newton's Law: the sum of the torques applied to an object equals the angular acceleration times the object's moment of inertia: $\Sigma T=J\alpha$. The torques present in the preferred system model of FIG. 1 are the applied torque (which is proportional to the motor current), and the opposing torques caused by viscous friction, coulomb friction, and gravity:

$$T_{applied}-T_{viscous}-T_{Coulomb}-T_{gravity}=J\alpha$$

This concept can be applied equally to linear motors, where the sum of th forces is equal to mass times acceleration (ΣF=ma). While the remaining discussion is tailored toward a rotary motor application, it should be understood that the concepts can easily apply to linear motors as well.

As discussed above, it is known that the torque due to viscous friction can be modeled as a constant times the velocity, that the torque due to Coulomb friction can be modeled as a constant times the sign of the velocity, and that the torque due to gravity can be modeled as a constant. It is also known that a is the derivative of velocity. Accordingly, the Newton's law equation for the preferred model of FIG. 1 can be expressed in terms of velocity:

$$T_{CMD} - (T_{fc} \times \text{sign}(V)) - (B \times V) - T_{const} = J \times \frac{dV}{dt} \quad (9)$$

Where $T_{CMD}$ is the torque command to the torque control loop (and corresponds to the output of junction 18 of FIG. 1), $T_{fc}$ is the component of torque caused by Coulomb friction (and corresponds to the output of block 50 of FIG. 1) V is the motor shaft velocity (and corresponds with the output of block 24 of FIG. 1), B is the coefficient of viscous friction (and corresponds to the output of block 52 of FIG. 1), $T_{const}$ is the constant offset torque (and corresponds to the output of block 54 of FIG. 1) and J is the total apparent inertia of the axis (and corresponds to the value J in block 24 of FIG. 1).

The terms in the above equation which are known or directly measurable are:

$T_{CMD}$—The digital servo-controller's total torque command to the torque control loop. This parameter can be captured during execution of the test program.

V—The digital servo-controller's measured motor velocity (RPM). The velocity can be captured during execution of the test program, and is preferably captured simultaneously with the torque command at discrete times.

sign(V)—Indicates whether V is a positive (+) or a negative (−) value.

dV/dt—The derivative of the motor speed. This can be approximated from V.

Accordingly, the four terms in equation (9) which are unknown are the model parameters: $T_{fc}$, B, $T_{const}$, and J. Because there are four unknown terms, in order to avoid an underdetermined system, it is preferred that at least four measurements of the motor feedback velocity V and the reported torque command $T_{CMD}$, are taken. This results in a at least four simultaneous equations which can then be solved for the four unknowns. Even more preferably, the number of measurements of velocity V and torque command $T_{CMD}$ taken is in the thousands to tens of thousands. This results in an "overdetermined" system (more equations than unknowns) which increases accuracy and decreases the chance that noise or bad measurements will affect the results.

The set of simultaneous equations may be represented in matrix form as shown below, using a common mathematic nomenclature. In the following equation, the parameter τ represents the time at which a measurement was taken.

$$\begin{bmatrix} \frac{dV}{dt}(t_1) & V(t_1) & \text{sign}(V(t_1)) & 1 \\ \frac{dV}{dt}(t_2) & V(t_2) & \text{sign}(V(t_2)) & 1 \\ \frac{dV}{dt}(t_3) & V(t_3) & \text{sign}(V(t_3)) & 1 \\ \vdots & \vdots & \vdots & \vdots \\ \frac{dV}{dt}(t_n) & V(t_n) & \text{sign}(V(t_n)) & 1 \end{bmatrix} \begin{Bmatrix} J \\ B \\ T_{fc} \\ T_{const} \end{Bmatrix} = \begin{Bmatrix} T_{CMD}(t_1) \\ T_{CMD}(t_2) \\ T_{CMD}(t_3) \\ \vdots \\ T_{CMD}(t_n) \end{Bmatrix} \quad (10)$$

This equation can then be rewritten using symbols to represent the matrices and vectors involved:

$$[A] \times \{P\} = \{T_{CMD}\} \quad (11)$$

Techniques for solving this equation for the four unknown parameters in the vector {P} are discussed in detail below. The remainder of this section discusses how information from data acquisition can be used to construct the matrix [A] and the vector {$T_{CMD}$}.

In particular, the columns of matrix [A] contain sequences derived from the motor velocity data acquisition measurement. The first column of [A] contains the derivative of the motor velocity, i.e. motor acceleration. This can be derived from measurements of the motor velocity. The motor acceleration is approximated by computing the difference between the next value of motor velocity and the previous value of motor velocity, as shown in equation (12). This method is preferred over using the forward or backward difference between two successive velocity measurements because it provides a better estimate of the derivative at time t, is more immune to noise, and results in no pure time delay because the data is post-processed. It is most convenient for all rows in the matrix [A] to represent successive measurements in time where the time increment between measurements is the smallest possible, such as by using increments of the control's basic process interval (BPI, e.g, 3 milliseconds or 5 milliseconds.) This time interval is designated in equation (12) below by the symbol $t_s$.

Taking all this into consideration, it is preferred that the accelerations in the first column of [A] are determined from the following equation where the velocity V(t) is in units of revolutions per minute, and the acceleration dV/dt is in units of rad/sec$^2$:

$$\frac{dV}{dt}(t) = \frac{2\pi}{60} \times \frac{V(t+t_s) - V(t-t_s)}{2t_s} \quad (12)$$

In order to save computation time, some of the terms of this equation (e.g., 2Π/60 times 1/2$t_s$) can be combined into a single variable, and this variable computed once, rather than for every axis measurement taken.

The second column of [A] is the motor velocity V(t) in units of rpm and is based on the measurements of motor feedback velocity.

The third column of [A] can be computed by checking for the sign (positive or negative) of V(t), where sign(0) is preferably defined to be 1, such as according to the following equation:

$$\text{sign}(V(t)) = \begin{cases} +1, & V(t) \geq 0 \\ -1, & V(t) < 0 \end{cases} \quad (13)$$

The fourth column of [A] contains all 1's.

Turning now to the vector {$T_{CMD}$} of the equation (11), this vector is based on the motor torque command signal reported by the digital servo for each velocity measurement taken. Thus, for each velocity that is recorded at the update interval, the commanded torque is also recorded so as to correlate the two. The torque command is preferably in units of Newton-meters.

2. Zero Phase Filtering of the Velocity and Torque Command Measurements

In the previous section, it was shown how data acquisition measurements can be used to create the matrix [A] and the vector $\{T_{CMD}\}$. Often, however, the dynamics of the machine tool's axis includes modes of vibration which occur at relatively high frequencies which are not included in the preferred model described above. The results of these vibrations may appear as noise on the data acquisition velocity and torque command signals. Additionally, torque ripple from the motor and cyclic error from the feedback device are two sources of noise which may appear as a periodic signal superimposed on the torque command and motor velocity waveforms. In order to limit the effects of these signals on the parameter tuning algorithm, it has been found that the data acquisition signals should undergo a process of linear digital low-pass filtering to remove any high frequency vibrations, torque ripples, or cyclic errors.

The rationale for filtering the signals to remove the noise components is that these are non-linear disturbance inputs which are not addressed by the feedforward algorithm. If the filter is able to remove the effects of nonlinearities from both the motor velocity and torque command, then the result of the estimation should accurately model the linear aspects of the dynamics. It is also preferred that both velocity and torque commands are filtered because both signals can contain noise.

One important benefit gained by digital filtering of the torque command and motor velocity signals is that it prevents the high frequency content of these acquired signals from causing the algorithm to incorrectly indicate that the model does not correctly describe the linearized system. In other words, filtering prevents inappropriately low values of model "coherence" (coherence is described in further detail below). It should be understood that the torque command and velocity feedback signals used to populate the matrices of equation (10) should be the signals after having undergone filtering.

In the preferred embodiment, the high frequency content of the motor velocity and torque command signals are removed using a fourth-order zero-phase digital low-pass filter. The cutoff frequency for this filter can be fixed at a predetermined level, such as 150 Hertz. While other appropriate values can be utilized, this value is preferred because even on the highest performance machines, it is not expected that the machine positioning system will be required to respond more quickly than 150 Hertz. In general, the cutoff frequency should be high enough to not ruin signal content caused by inertia and friction.

Identical filters should be applied to both the velocity and torque command because any low frequency amplitude attenuation on the velocity signal must be duplicated on the torque signal in order for the equations to remain valid. In other words, if both sides of equation (11) are acted upon by an equivalent filter, then the equation remains valid.

The fourth order zero phase filter can be the product of two second order filters which have identical amplitude characteristics and have phase characteristics which are the negative of each other. Alternatively, the zero phase filter can be implemented by filtering the signal with a second-order causal filter and then filtering the filtered signal with the same second-order causal filter, but in reverse time. This process is shown for the example of motor velocity in the following equations. In the equations: v(k) is the data acquisition motor velocity at sequence number k, r is an intermediate variable, $\bar{v}(i)$ is the zero-phase filtered velocity, and N is the number of data points in the measurement. An analogous set of equations should be used to filter the torque command.

$$r(0)=v(0) \tag{14}$$

$$r(1)=v(1)$$

$$r(k)=a_2r(k-2)+a_1r(k-1)+b_2v(k-1)+b_0v(k),$$

$$k=2, 3, \ldots, N$$

$$\bar{v}(N-1)=r(N-1)$$

$$\bar{v}(N-2)=r(N-2)$$

$$\bar{v}(i)=a_2\bar{v}(i+2)+a_1\bar{v}(i+1)+b_2r(i+2)+b_1r(i+1)+b_0r(i),$$

$$i=N-2, N-3, \ldots, 3, 2, 1$$

The coefficients of the filter are preferably based on a second order system with $f_c$=150 Hertz bandwidth and $\zeta$=0.707 damping ratio. The filter coefficients can be derived based on a matched zero-pole mapping of a continuous time second order filter.

$$a_1 = 2e^{-\zeta f_c t_s} \times \cos(\zeta f_c t_s), \quad a_2 = e^{-2\zeta f_c t_s}, \quad g = \frac{1-a_1-a_2}{4} \tag{15}$$

$$b_2=g, b_1=2g, b_0=g \tag{16}$$

3. Solution of the Matrix Equation a. Normal Equations

As noted above, thousands to tens of thousands of motor velocity and motor torque command measurements are made during the test motion. Accordingly, matrix Equation (11) represents an overdetermined system where there are more equations than unknowns. The set of equations can be solved for the four unknowns using a mathematical technique known as the "least squares technique" which minimizes the sum of the square of the error between the modeled motor torque and the measured motor torque command:

$$\Sigma e^2=\{[A]\times[P]-\{T_{CMD}\}\}^T\times\{[A]\times[P]-\{T_{CMD}\}\} \tag{17}$$

The solution for the parameter vector $\{P\}$ that minimizes this quantity is the least squares solution. Two possible techniques for finding this solution are the "normal equations" technique, and "singular value decomposition."

According to the former, the vector $\{P\}$ is written using the so-called normal equations.

$$\{P\}=[[A]^T[A]]^{-1}[A]^c\{T_{CMD}\} \tag{18}$$

As can be seen from equation (18), the normal equations solution requires inversion of the matrix $[[A]^T[A]]$. This matrix has the properties of being real, and symmetric. Because of these properties, the matrix inverse can be computed using Jacobi's method for finding the eigenvalues and eigenvectors of a real symmetric matrix. Briefly stated, Jacobi's method involves successively applying rotation transformations to portions of the matrix until it is diagonalized. A full explanation of Jacobi's method is given in "Numerical Recipes in C" by Press, Flannery, Teukolsy and Vettering, and in "Matrix Computations, Second Edition,"

by Golub and Van Loan (Johns Hopkins Univ. Press, 1989), both of which are hereby incorporated by reference. The technique is guaranteed to work as long as the matrix is invertible.

More specifically, the matrix inverse $[[A]^T[A]]^{-1}$ is required to solve the normal equations. This inverse can be determined from the eigenvalues $\lambda$ and normalized eigenvectors $\{X_i\}$ of $[A]^T[A]$, which can be found using Jacobi's method. It can be shown that the eigenvectors of a real symmetric matrix are orthogonal to each other. Thus the following approach can be used, where the eigenvectors $\{X_i\}$ are normalized to have unity magnitude.

$$[\{A\}^T\{A\}][\{X_1\}\{X_2\}\{X_3\}\{X_4\}] = [\{X_1\}\{X_2\}\{X_3\}\{X_4\}]\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \quad (19)$$

Right multiplying both sides by the transpose of the matrix of eigenvectors leads to:

$$[\{A\}^T\{A\}] = [\{X_1\}\{X_2\}\{X_3\}\{X_4\}]\begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix}[\{X_1\}\{X_2\}\{X_3\}\{X_4\}]^T \quad (20)$$

Taking the inverse of both sides of this relation provides the desired quantity.

$$[\{A\}^T\{A\}]^{-1} = [\{X_1\}\{X_2\}\{X_3\}\{X_4\}]\begin{bmatrix} 1/\lambda_1 & 0 & 0 & 0 \\ 0 & 1/\lambda_2 & 0 & 0 \\ 0 & 0 & 1/\lambda_3 & 0 \\ 0 & 0 & 0 & 1/\lambda_4 \end{bmatrix} \quad (21)$$

$$[\{X_1\}\{X_2\}\{X_3\}\{X_4\}]^T$$

This quantity can then be used in equation (18) to solve for the vector $\{P\}$ b. Singular Value Decomposition An alternative "least squares" solution to the normal equations technique for solving for $\{P\}$ is to use "singular value decomposition." One advantage of singular value decomposition is that it is numerically more robust (i.e., is less sensitive to numerical roundoff error ) than the "normal equations" solution and provides a useful quantity known as the matrix condition number, which is described in further detail below.

Normally, singular value decomposition is a complex and expensive algorithm. However a much simpler approach can be used for matrices with a small number of columns. It can be shown that for a matrix [A] which has at least as many rows as columns, the singular values are identical to the square root of the eigenvalues of $[A]^T[A]$. The eigenvalues may be obtained by Jacobi's method.

$$SVD([A]) = \sqrt{eig([A]^{T[A]})} \text{ i.e., } w_i = \sqrt{\lambda_i} \quad (22)$$

Further details on the singular value decomposition method can be found in "Numerical Recipes in C." Accordingly, the singular value decomposition technique and the normal equations technique are two exemplary methods which can be utilized for solving equation (11) for the vector $\{P\}$. The values which are found are $T_{fc}$ (the component of torque caused by Coulomb friction) B (the coefficient of viscous friction), $T_{const}$ (the constant offset torque), and J (the total apparent inertia of the axis.) Accordingly, with reference to FIG. 1, $T_{fc}$ can be used as the gain $G_{COUL}$ of the Coulomb friction feedforward function 34, B can be used as the gain $G_{VISC}$ of the viscous friction feedforward function 36, $T_{const}$ can be used as the gain $G_{CONST}$ of the constant offset feedforward function 38, and J can be used to determine the gain $G_{AFF}$ of the acceleration feedforward function 32.

With regard to the acceleration feedforward function 32 in particular, the total apparent inertia J of the axis, which is automatically determined using the invention, can be used to set the value of the feedforward inertia estimate $G_{INERTIA}$. Then, the gain $G_{AFF}$ of the function 32 can be set to 100%. In other words:

$$G_{INERTIA} = J$$

$$GAFF = 100\% \quad (23)$$

The gain $G_{AFF}$ can later be tweaked as desired and/or needed.

In an alternative embodiment, the percentage acceleration feedforward gain, $G_{AFf}$ of the acceleration feedforward function 32 can be determined by dividing the estimate of the actual inertia J as seen at the motor shaft, (which is automatically determined by solving the vector $\{P\}$), by the value "total_inertia", which is an estimated inertia parameter configured for the machine based upon the configurations of the various mechanical components which make up the system. The total_inertia is comparable to the continuous time value of $J_e$ shown in FIG. 1.

In this alternative embodiment, if the acceleration feedforward gain, $G_{AFF}$, differs greatly from 1, then there was either a problem with the test, or one or more of the configuration values is set incorrectly. It may be advantageous to modify the total_inertia, re-tune the velocity loop's proportional and integral gains, and re-perform the auto-tuning.

4. The Condition Number and Excitation Number

As noted above, the singular value decomposition method is preferred for solving equation (11) because it provides a matrix condition number. As discussed below, it has been found that this number can indicate how well the test program "excited" the axis.

As described above, the eigenvalues, $\lambda_i$, and the eigenvectors, $\{X_i\}$, of $[A]^T[A]$ can be found using Jacobi's method. The condition number of [A] can then be determined as follows.

$$\text{condition number} = C_{NUM} = \sqrt{\frac{\lambda_{max}}{\lambda_{min}}} \quad (24)$$

Thus, the matrix condition number of the matrix is the maximum singular value of [A] divided by the minimum singular value of [A].

Mathematically, the singular values of [A] can be viewed as describing the contributions of the corresponding column of [A] toward the rank of [A]. In other words, the condition number describes the uniqueness of the columns of [A] with respect to each other. A condition number of 1 indicates total uniqueness. As the condition number increases, the columns are less unique.

In terms of the present case where [A] is determined from velocity measurements in a machine tool system, according to one aspect of the present invention, it has been found that a small condition number means that the test motion contained enough complexity to excite all aspects of the axis.

For example, in terms of the preferred embodiment of FIG. 1, the test program contained sufficient changes in position, velocity, acceleration, and direction to excite the various gravity, friction, and inertia phenomena modeled in the system diagram and included in the Newton's law equation. As the condition number increases, one aspect of the axis is being excited more than another. In the extreme case where the condition number is infinite, the test program is such that it is impossible to distinguish between two different aspects of the model. For example, if the machine's test motion is such that the axis only travels with a positive velocity, it would be impossible to distinguish between the Coulomb friction and the constant offset, and the condition number would be infinity. Another example is if the axis were undergoing constant acceleration and positive velocity during the entire measurement In this case, it would be impossible to distinguish between Coulomb friction, inertia, and constant offset effects.

When the condition number is large, but not infinite, the excitation is such that it becomes difficult to distinguish between different aspects of the axis. In the presence of measurement noise, a large condition number indicates that a phenomenon due to one aspect of the model may be falsely attributed to another aspect of the model. This should be avoided because it can result in values for the feedforward parameters that can cause feedforward to be incorrectly applied.

While a large condition number indicates that the different modes of the dynamics model may not have been excited equally, it can be difficult to determine whether the condition number is large when considering the fact that it can vary from 1 to infinity. For the purpose of determining the level of excitation, the largeness of the condition number is strictly relative. More specifically, the condition number of [A] depends on the units representation of each column of [A]. For example, if the first column of [A] contained acceleration expressed in units of rev/sec$^2$ instead of rad/sec$^2$ and the second column contained velocity expressed in rev/sec instead of rpm, then the condition number of [A] would change. This would not mean that the level of excitation had changed.

Accordingly, it has been found that the condition number can be scaled to aid in the reading of the relative size of the condition number. One possibility is to scale the columns of [A] to change the condition number. If [A] is scaled in such a way that the condition number is minimized, then the condition number of the scaled matrix [A] would be an absolute measure of the ratio of the amount of excitation of the most excited mode to the amount of excitation of the least excited mode. One alternative method of achieving scaling is to scale the columns of [A] is to scale them with respect to the known axis configuration and known information about the excitation part program.

The preferred approach is to scale each column of [A] such that the maximum value in the column would be expected to be 1000. This can be accomplished by scaling the n'th column of [A] by the scaling factor $C_n$. In particular, the first column can be scaled by a factor which is 1000 divided by the maximum expected acceleration of the motor based on the axis configuration data. The maximum motor acceleration expected to be achieved during the test (shown as "motor_accel" in the equation below) is computed automatically by the controller and saved as a constant.

$$C_1 = \frac{1000}{\text{motor\_accel\_max}} \tag{25}$$

The second column of [A] can be scaled by a factor which is 1000 divided by the maximum expected motor velocity (motor_vmax). It can computed based on the maximum programmed feedrate for the excitation program. As discussed below, this value can be provided by the user, or automatically set by the algorithm if the user-entered parameter exceeds a certain value.

$$C_2 = \frac{1000}{\text{motor\_vmax}} \tag{26}$$

The scaling factor for the last two columns can be set to 1000.

$$C_3 = 1000 \tag{27}$$

$$C_4 = 1000 \tag{28}$$

When scaling the condition number using this preferred manner, the condition number provides a better indication of how close the excitation program came to being able to excite each mode of the dynamic model equally and sufficiently. Experimentation on a wide variety of machine tool axes has indicated that, with these preferred scaling values, a large condition number is about 10,000 or larger. Such a number indicates that a problem may have been encountered. For example, the test's setup parameters might be inappropriate, or an unexpected event may have occurred during execution of the test. Examples of this could be an incomplete data acquisition record due to limited buffer size, a lack of axis motion due to an axis inhibit or feed hold, or an incorrect or new configuration setting (e.g. axis acceleration rate). Other problems causing large condition numbers might be improper settings in the control, damaged machine components, or a change in servo feedback gain. A large condition number may indicate that the data should be rejected, the cause of the problem determined, and the test re-administered. Alternatively, a large condition number may indicate that a different excitation program should be utilized.

Scaling the columns of [A] causes a corresponding scaling of the model parameters contained in {P}. These scaling factors must be removed from {P} once it is solved before the parameters of the vector {P} can be used to derive feedforward gains. The effect of scaling factors, $C_i$, on the system of equations is seen by rewriting equation (11) where the columns of [A] are scaled.

$$[C_1\{A_1\} \quad C_2\{A_2\} \quad C_3\{A_3\} \quad C_4\{A_4\}] \begin{Bmatrix} J/C_1 \\ B/C_2 \\ T_{FC}/C_3 \\ T_{const}/C_4 \end{Bmatrix} = \{T_{CMD}\} \tag{29}$$

From the preceding equation, it can be understood that, for a matrix [A] whose columns are scaled by factors $C_i$, the model parameters are derived from the elements of the parameter vector {P} using the following equations.

$$J = C_1 \times P_1, \ B = C_2 \times P_2, \ T_{fc} = C_3 \times P_3, \ T_{const} = C_4 \times P_4 \tag{30}$$

In summary, scaling the matrix [A] allows for a more meaningful and easy-to-interpret condition number for determining the sufficiency of excitation of the axis by the excitation program. However, scaling the matrix [A] causes a corresponding scaling of the derived model parameter (J, B, $T_{FC}$, and $T_{CONST}$), and this scaling factor must be removed from these parameters before using them to calculate feedforward gains.

In addition to scaling the matrix (A) to make the condition number easier to interpret, an excitation number can also be derived to further aid in interpretation of the level of excitation. The excitation number is a value defined to represent the same information as the condition number (after scaling), but is easier to interpret. The excitation number preferably varies from 0 to 1 where 0 indicates very poor excitation and 1 indicates excellent excitation. More specifically, this number is preferably a logarithmic function of the condition number. The excitation number can be constructed such that it has a value of 0 when the condition number is unacceptably high and a value of 1 when the condition number is acceptably low. A preferred definition of the excitation number is shown below.

$$\text{excitation} = \begin{cases} 1 - \dfrac{\log_{10}\{C_{\text{NUM\_best}}\} - \log_{10}\{C_{NUM}\}}{\log_{10}\{C_{\text{NUM\_best}}\} - \log_{10}\{C_{\text{NUM\_worst}}\}}, & C_{\text{NUM\_best}} \le C_{NUM} \le C_{\text{NUM\_worst}} \\ 1, & C_{NUM} < C_{\text{NUM\_best}} \\ 0, & C_{NUM} > C_{\text{NUM\_worst}} \end{cases} \tag{31}$$

In the equation, $C_{NUM}$ is the condition number of the [A] matrix, $C_{NUM\_best}$ is the condition number threshold which indicates completely sufficient excitation, and $C_{NUM\_worst}$ is the condition number threshold which indicates completely insufficient excitation. The values for $C_{NUM\_best}$ and $C_{NUM\_worst}$ can be hard coded. Based on empirical data, the values for these condition number thresholds are preferably defined as follows (when the preferred scaling factors discussed above have been utilized to obtain the condition number).

$C_{NUM\_best} = 3$ $C_{NUM\_worst} = 10{,}000 \tag{32}$

However, additional experience with implementation of the present invention in particular applications may reveal a requirement that these values be adjusted. Also, the use of different scaling factors may necessitate a corresponding change of $C_{NUM\_best}$ and $C_{NUM\_worst}$.

Figure 2:
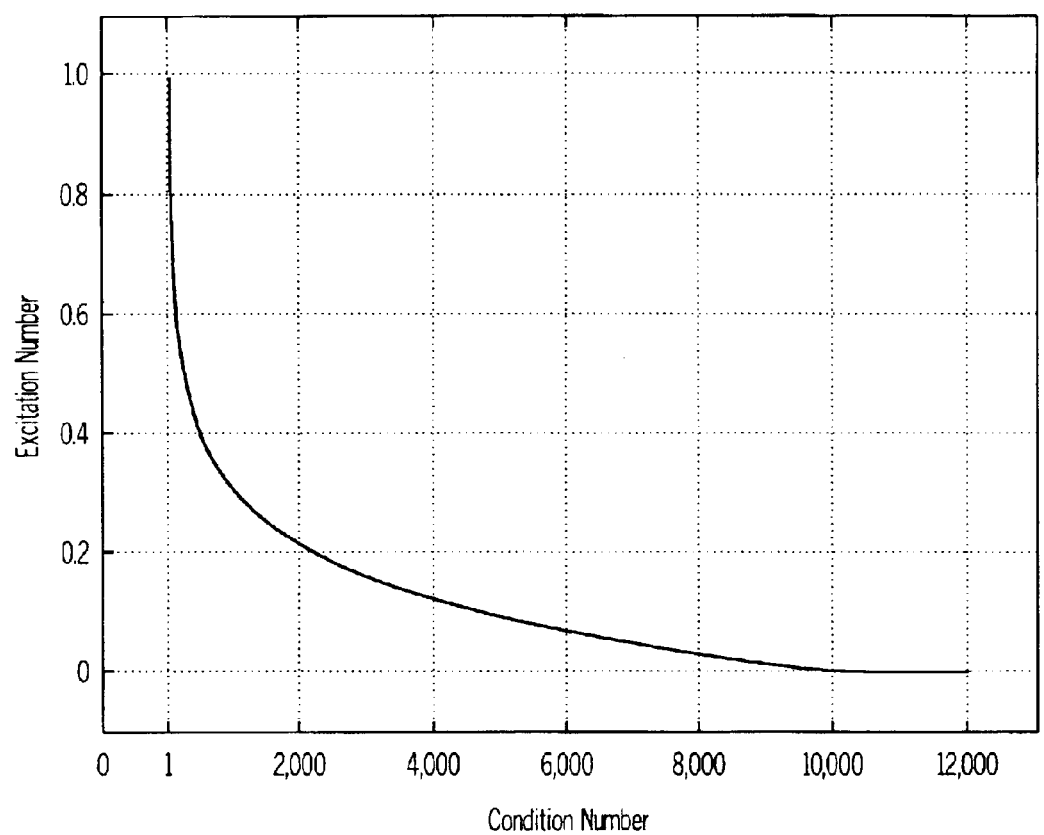
FIG. 2 is a graph illustrating a relationship between excitation number and condition number, according to one embodiment of the present invention.

A plot of a preferred relationship between the excitation number and the condition number is shown in FIG. 2. As shown in the figure, the excitation number varies from 0 to 1.0, and is closer to 1.0 when the condition number is low (e.g., close to 1), and is closer to 0 when the condition number is high (e.g. close to 10,000).

Accordingly, as shown above, it is contemplated that a variety of methods could be utilized for scaling or adjusting the condition number to allow it to be better interpreted in terms of the sufficiency of excitation of the test part program.

5. Computation of Model Coherence as a Confidence Factor

According to one aspect of the present invention, a model coherence number can be derived to serve as an indicator of how well the assumed structure for the axis dynamics model was able to describe the measured behavior. In other words, the coherence indicates how well statistically the four parameters which were found by solving the matrix equation (11) (i.e. J, B, $T_{FC}$, and $T_{CONST}$), relate to the measured behavior as recorded by the data taken. Because thousands of measurements are taken and the system is overdetermined, the measured torque commands will not exactly equal the theoretical torque commands found using the solved parameters. In other words, the solved parameters are analogous to an "average" which is based upon the thousands of data points taken.

In the preferred embodiment, the coherence is based upon the motor torque command $T_{CMD}$, measured during the test excitation program, and a theoretical motor torque $T_M$. The theoretical motor torque TM can be computed from the model by solving for the vector {P} as described above, and inserting the solved vector {P} into the following equation:

$$T_M = [A]\{P\} \tag{33}$$

where [A] is the input matrix before scaling and {P} is the parameter vector with scaling removed.

Then, the coherence $\rho^2$ can be calculated as the square of the covariance of $T_{CMD}$ and $T_M$, divided by the following quantity: variance of $T_{CMD}$ multiplied by variance of $T_M$.

$$\rho^2 = \frac{(\text{COV}(T_M, T_{CMD}))^2}{\text{VAR}(T_M) \times \text{VAR}(T_{CMD})} \tag{34}$$

The explicit computations involved in the above are given in the following equation, where the summation is taken over each component of the sequence and the overbar indicates the average value of the sequence.

$$\rho^2 = \frac{\left\{\sum ((T_{CMD}(t) - \overline{T}_{CMD}) \times (T_M(t) - \overline{T}_M))\right\}^2}{\sum (T_{CMD}(t) - \overline{T}_{CMD})^2 \sum (T_M(t) - \overline{T}_M)^2} \tag{35}$$

Thus, in the preferred embodiment, the coherence $\rho^2$ is a number between 0 and 1.0. A coherence of 1.0 indicates that the axis behaved in such a way that the model was able to perfectly describe all aspects of axis behavior as indicated by the measurements. A coherence which is low, for example less than 0.8 or 0.7, suggests that the axis is experiencing behavior which is not predicted by the dynamics model used. As noted, the preferred model of FIG. 1 takes into account Coulomb friction, viscous friction, gravitational effects, and inertia. A low coherence may also be caused by large amounts of measurement noise or axis vibration, or disturbance effects such as torque ripple.

If the coherence number is consistently low on a certain axis of certain machines and the level of noise and disturbances is low, then the model might not adequately describe the axis, and feedforward might only partially reduce the following errors. Enhancements to the feedforward algorithm might be necessary to account for un-modeled behavior. A coherence larger than 0.9 indicates a good match between the model and the actual behavior. This means that the ability of feedforward to remove following errors is expected to be good. Thus, the coherence can indicate confidence in the accuracy of the modeled parameters.

Figure 11:
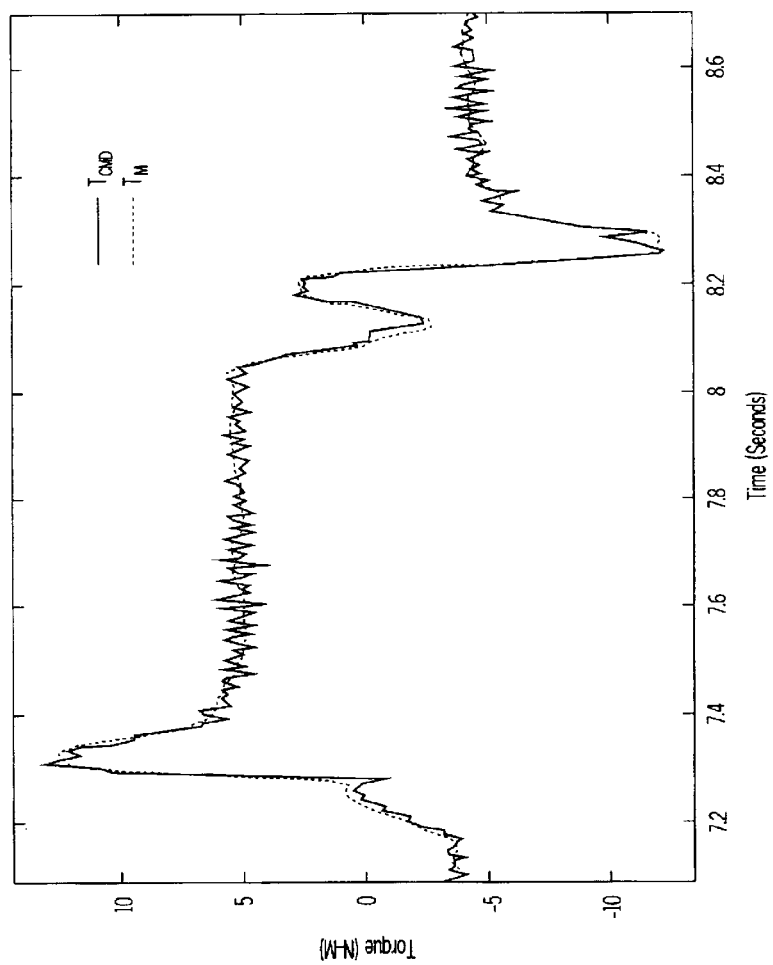
FIG. 11 is a torque vs. time graph, plotting both commanded torque and modeled torque as a function of time, according to one aspect of the present invention wherein the sufficiency of the excitation program is analyzed.

In addition, it has been found to be useful to simultaneously plot modeled torque ($T_M$) vs. time as well as commanded torque ($T_{CMD}$) vs. time, in order to provide a visual representation of possible reasons for a low coherence value. FIG. 11 is an example of such a graphical representation, wherein the solid line indicates the commanded torque $T_{CMD}$, and the dashed line indicates the modeled or synthesized torque $T_M$.

6. Flow Chart of Preferred Auto-tuning Procedure

Figure 3:
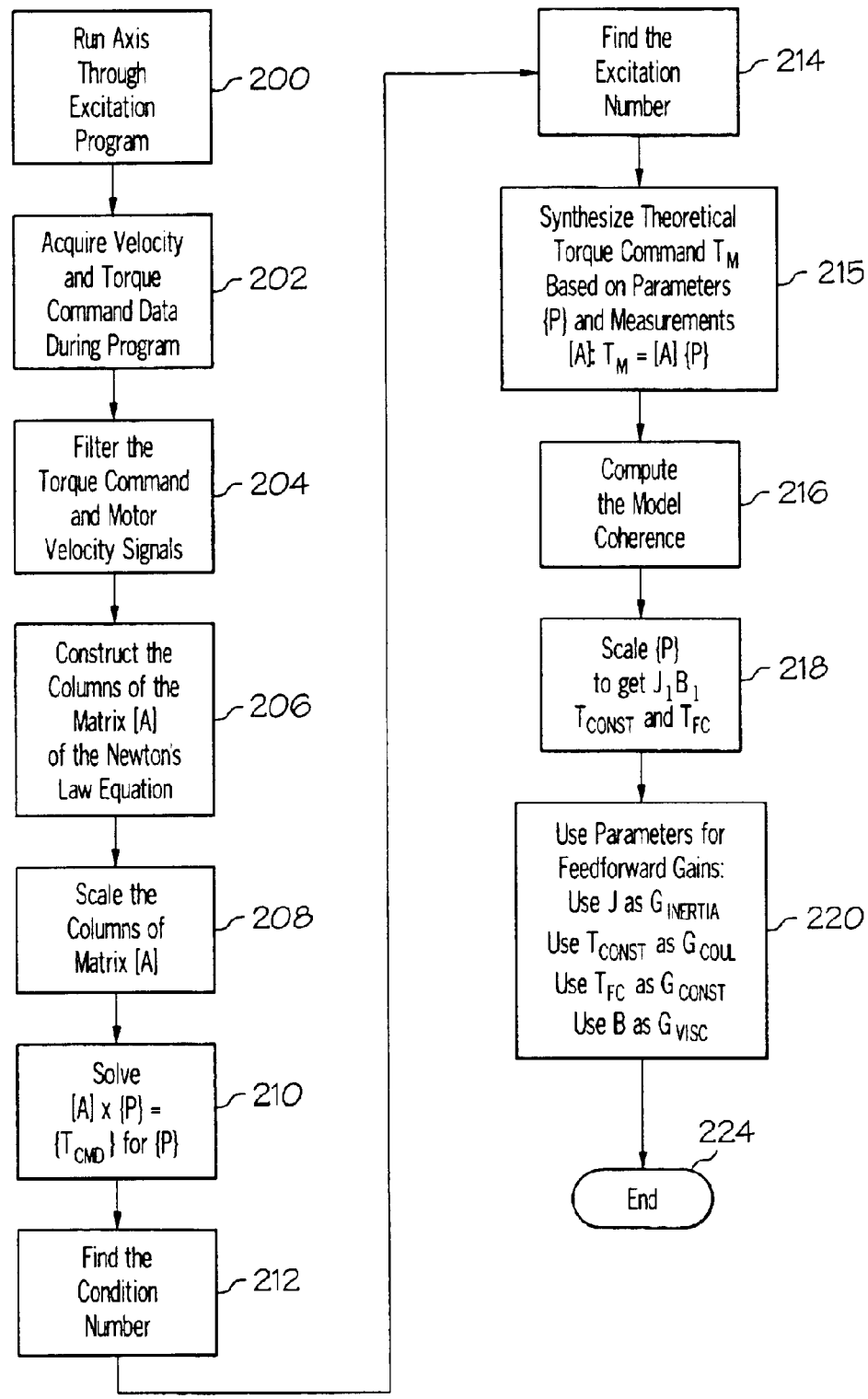
FIG. 3 is a flow diagram illustrating one method of operation of the tuning method of the present invention.

FIG. 3 is a flow chart illustrating the steps in implementing the above-described automatic feedforward gain determination algorithm, according to a preferred embodiment of the present invention. At step 200, the axis which will be auto-tuned is run through a test excitation program. As described in further detail below in section III, it is preferred that this test program moves the axis back and forth at increasing maximum velocities. However, as also described below, other test motions could be utilized, so long as sufficient excitation as described herein is provided.

During the excitation program, step 202 is executed, and the data acquisition capabilities of the CNC record the motor speed V, and the corresponding total torque command $T_{CMD}$ which is fed to the torque control loop of the controller. It is preferred that thousands or tens of thousands of data points are taken relating motor speed to torque command.

Figure 12:
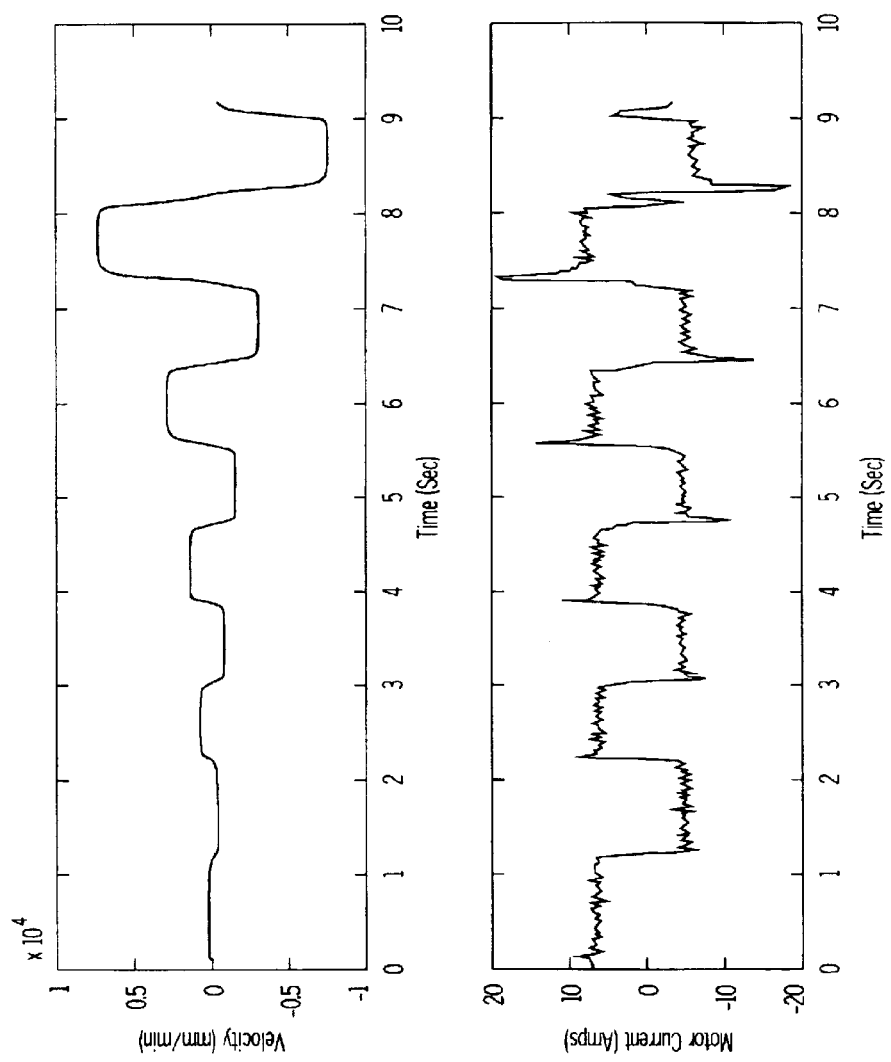
FIG. 12 is a graph indicating measured motor velocity and measured motor current with respect to time, the measured values being used by one embodiment of the present invention to automatically estimate feedforward parameters.

Alternatively, other system operation data could be taken. For example, as an alternative to recording the torque command, the motor current which corresponds to each velocity could be recorded. In this case, the term $T_{CMD}$ of equation (9) should be replaced by the term $K_t*I$, where I is the measured motor current in amps, and $K_t$ is the value for the motor torque constant used by the CNC and is based upon the type of motor used. Accordingly, using the motor current multiplied by the motor torque constant is equivalent to using the motor torque command itself. (If a three-phase AC motor is used, the three phase motor current must be transformed to a single phase equivalent. Also, this value for torque will be slightly different from the torque command due to the dynamics of the current control loop as modeled by block 20 of FIG. 1). FIG. 12 is an exemplary graph illustrating current and velocity measurements for one exemplary excitation program, the measurements being useful for automatically tuning the feedforward parameters according to this alternative embodiment. It is also contemplated that, according to another alternative embodiment, equations could be set up based upon system operation data comprising the velocity command and the corresponding velocity output of the motor.

Once the data is collected, it is preferred that the data is filtered, as shown at step 204. It is preferred that equations (14), (15), and (16) described above are utilized for zero-phase-filtering the data.

After the data is filtered, it can then be used in the Newton's law equation described above, wherein the sum of the torques applied are set equal to the acceleration times the moment of inertia. Equation (11) shows this equation in matrix form. To set up the matrix [A] of equation (11), equations (10), (12), and (13) can be utilized, as described above. In the flow diagram of FIG. 3, these steps are represented as block 206.

Once the matrix [A] of the Newton's law equation is set up, the columns of the matrix should be scaled, as discussed above, in order to provide for a condition number which is easier to interpret. Equations 25–28 can be utilized for this scaling process, which is represented as step 208 of FIG. 3.

Once the matrix [A] is scaled, the vector {P} of the Newton's law equation can then be solved, at step 210. Possible methods for solving the equation include the normal equations technique and the single value decomposition technique. The steps involved in solving the equation using the normal equations technique include finding the quantity $[A]^T[A]$, using Jacobi's method for finding the eigenvalues and eigenvectors of $[A]^T[A]$, using the eigenvalues and eigenvectors, along with equation (21), for finding the inverse of $[A]^T[A]$, and using equation (18) to find the scaled parameter vector {P}.

Once the eigenvalues and eigenvectors are known, step 212 can be executed and a condition number can be calculated to determine the level of excitation achieved by the excitation program. Equation (24) can be utilized for this purpose. After the condition number has been found, step 214 can be performed, and an excitation number can be determined, which allows the condition number to be more easily interpreted. Equations 31–32 can be utilized for determining the excitation number.

Then, at block 215, a theoretical torque command sequence $T_M$ is "synthesized," such as by using equation 33 above. As discussed above, it can be useful to compare this theoretical, or "modeled" torque to the actual torque commands, such as by plotting the two on the same graph.

Next, at step 216, a model coherence number can be calculated to determine how well the values obtained for the solved vector {P} correspond to the actual measurements which were recorded during step 202. Equation (35) can be utilized to obtain the model coherence number Then, at step 218, the vector {P} can be scaled to arrive at the actual values of viscous friction B, the constant offset (gravitational) torque $T_{CONST}$, the Coulomb friction torque $T_{fc}$, and inertia J. Equation (30) can be used for this scaling. Once these parameters are found, they can be used for the viscous friction feedforward parameter $G_{VIC}$, for the constant offset feedforward parameter $G_{CONST}$, and for the Coulomb friction feedforward $G_{COUL}$, and for the inertia parameter $G_{INERTIA}$ respectively. This step is shown in FIG. 3 as step 220. Then, the acceleration feedforward gain $G_{AFF}$ can be set to 100%.

Alternatively and as discussed above, the gain $G_{AFF}$ can be calculated such that, when multiplied by the total inertia (estimated manually), the product equals the solved inertia parameter J of the vector {P}.

Accordingly, the steps described above allow for the automatic tuning of feedforward parameters, thereby saving time, increasing accuracy, and eliminating the need for a skilled technician to perform calculations. It is contemplated that a number of alternative and/or additional equations and measurements could be utilized in automatically tuning these feedforward parameters. Also, it is contemplated that the method could be performed without the use of a condition number, excitation number, or coherence number. However, the excitation number and condition number are beneficial because they provide an indication of how well the test program which was utilized excited the various modes of operation of the axis. Also, the coherence number provides an indication of the accuracy of the derived parameters of the vector {P}.

In an alternative embodiment of the present invention, and as discussed in further detail below, PI compensator gains can also be estimated. In particular, a method and apparatus is disclosed for estimating the velocity loop parameters $K_p$ and $K_1$ from measurements of the torque command Tc, the velocity feedback Va, and the velocity command Vc. In this embodiment, the PI compensator parameters can be automatically estimated to allow for the implementation of a feedforward system on a hardware implementation utilizing an analog interface between the CNC and servo-drive. This embodiment is discussed in section V below.

III. Optimum Excitation Part Programs and Automatic Generation Thereof

According to one aspect of the present invention, the part program used to excite the axes can be automatically generated. The part program can be generated based on test setup data provided by the user, and a set of predetermined criteria expected to result in optimum excitation of all of the modes of the axis model.

According to the preferred embodiment, the excitation (i.e, test) part program excites each axis by commanding a series of moves, each axis being moved and tuned individually. The lengths of the moves, the velocities of the moves, the acceleration/deceleration mode of the moves, and the location of the other axes during the move can be determined based upon the setup data. The type of motion and sequence of moves is preferably predetermined, and based on knowledge about the machine tool behavior which will provide the optimum test program.

A. The Optimum Excitation Program for the Model

More specifically, the importance of sufficiently exciting all "modes" of behavior included in the structure of the model was discussed above. If the axis is not sufficiently excited, there is a possibility of falsely attributing an observed behavior to an improper component of the model. Another problem occurs when there is excitation of a behavior which is not included within the scope of the model, which, in the illustrated embodiment, accounts only for Coulomb and viscous frictions, inertia, and gravity. In such circumstances, the behavior might be falsely attributed to one of the "modes" contained within the structure of the model, or can result in reduced coherence. Accordingly, if the conditions under which one of these un-modeled modes of behavior is excited is unlikely to be encountered in real applications of does not benefit from feedforward, then excitation of this mode should be avoided. Examples of known modes of behavior which should be avoided, and how to avoid them are given below. By eliminating axis commands in the test program which may excite these modes, the excitation program can be defined by a set of axis commands which are appropriate for the model.

1. Situations to Avoid

The first mode of behavior which is preferably avoided is static friction or stiction. Static friction only plays a role when the axis is at rest. Since stiction feedforward is not incorporated by the preferred integrated feedforward model described above, it would be undesirable to have the part program excite stiction related phenomena. In many cases, stiction could result in a residual motor torque which gradually decays to zero after the axis comes to a complete stop. This behavior would likely be falsely attributed to Coulomb friction and should be avoided.

One way to avoid this behavior is to not allow the axis to come to a complete stop. However, this would require that the axis move in only one direction and would result in insufficient excitation for distinguishing between the Coulomb friction and the constant offset. Accordingly, it has been found that a way of nearly eliminating stiction effects is to limit the amount of time during which the axis is at a complete stop. This is done by commanding successive position commands with minimum dwell time between motion blocks (A motion block is a machine command or series of machine commands which will move the axis in the desired manner. The test program is preferably made of a series of motion blocks, as discussed below).

Another stiction related behavior to be avoided is the existence of a stiction pre-load prior to the beginning of axis motion. A pre-load can occur when the axis comes to a complete stop, but there remains, for some period of time, a motor current to counteract the combined effect of stiction and machine compliance. The effects of pre-load can be reduced by establishing a known pre-load prior to the sequence of excitation moves. This can be achieved by moving the axis in the direction of the first excitation move and dwelling for some period of time to allow the pre-load to decay. Thus, any pre-load which remains at the time of the first move will be in the direction of motion. This will have less of a corrupting influence on the estimates for feedforward parameters than would a pre-load that was opposite to the direction of motion.

Another mode of behavior that is preferably avoided that is related to stiction is low velocity friction. At very low speeds, Coulomb friction often increases. This effect has been observed on machine tools, but it is not included within the scope of the preferred feedforward model above. Thus, in order to prevent this un-modeled behavior from adversely impacting the model parameter estimates, excessively slow feedrates should be avoided. The minimum feedrate is one of the test setup parameters and the user should set up this parameter correctly to avoid excessively low feedrates. If the parameter is not programmed by the user, a default value of 10% of the maximum feedrate could be used.

As with excessively slow feedrates, excessively high feedrates should also be avoided. One phenomenon which could occur at high feedrates is that the motor voltage may near saturation. Another such phenomenon is the reduction of maximum available motor torque due to non-linear changes in the motor torque constant. This could result in a different type of system behavior than is observed at the lower feedrates. Many machines are capable of moving their axes at feedrates which are well above the feedrates where cutting could realistically take place. Since feedforward is typically not applied during rapid moves, excitation of the axis in the test program with rapid rate moves should be avoided.

Another phenomenon to be avoided is the excitation of structural arid drive-train resonances, i.e. modes of vibration. Resonances normally occur at frequencies which are higher than the cutoff frequencies associated with a servo-controller. The preferred model described above does not account for structural vibrations, so excitation of these modes of the axis dynamics should be avoided so that they are not falsely attributed to one of the modeled phenomena Since velocity and torque feedforward typically contain substantially more high frequency energy than position command signals, it is preferred that all feedforwards are disabled during execution of the test program.

The acceleration and jerk rates of the axis also affect the level of excitation of structural resonances. The acceleration rate should be high enough to excite the inertial portion of the system dynamics but not so high that structural vibrations result. The test program can be configured such that such excessively high accelerations are avoided.

Step changes in axis velocity also may excite structural vibrations. The excitation part program can avoid step changes in axis velocity by inserting a non-motion block between all motion blocks in order to force deceleration to zero velocity. Such a block should cause a deceleration to zero, but not dwell at zero velocity due to the reasons stated above regarding stiction effects.

In addition, aliasing may cause frequency oscillations in the torque commands to appear as oscillations of lower frequency or as a DC offset. Aliasing occurs when the frequency of oscillation in the torque command signal is higher than half the frequency at which the signal is sampled by data acquisition. This effect can lead to large errors in the estimates for feedforward parameters and should be avoided.

Accordingly, in order to avoid aliasing, high frequency oscillations in the motor current should be avoided. One particularly problematic cause of oscillations in the motor current is velocity feedforward. Velocity feedforward can cause oscillations in the current command when the axis undergoes acceleration. These oscillations are the result of the staircase velocity feedforward profile typically used by the digital servo. The response of the axis to the periodic discontinuities in the staircase profile can result in a motor current oscillation whose period is identical to the major update interval. Acceleration feedforward can have a similar effect during the changing acceleration portion (jerk roll regions) of the acceleration profile.

It has been found that these oscillations are greatly reduced if velocity and acceleration feedforward are turned off. Thus, when exciting the axis for the purposes of obtaining estimates for model parameters during the excitation program, it is preferred that velocity feedforward (as well as all other types of feedforward) are disabled. Furthermore, the digital servo should return a filtered velocity and torque command signal whereby a digital filter is applied to avoid aliasing of oscillations at a frequency of half the BPI and above.

2. Preferred Design For Excitation Program

As discussed, it has been found that the type of excitation which is required is that which will cause each of the modes of behavior accounted for in the model to be excited to an approximately equal level. It has also been determined that a number of motion situations are preferably avoided.

According to one aspect of the present invention, these considerations are combined with parameters provided by the user to automatically generate an excitation program. More specifically, according to one embodiment, when the automatic tuning feature is invoked, the user may choose to enter a number of parameters which define actuator movement limits via a user interface. These parameters can be stored permanently so that the user is not required to enter them each time. It is preferred that one of these user-definable parameters is a machining mode which indicates which predefined set of configuration parameters to be used during the excitation program. These configuration parameters include the step velocity limit, the acceleration limit, and the jerk limit. If no machining mode is entered by the user, a default of "general machining" is selected to establish the most general operating mode for the particular machine. For some common machines, and as a point of reference and example, this configuration could include a step velocity limit of about 1000 mm/min an acceleration limit of about 2000 mm/sec$^2$, and a jerk limit of about 40,000 mm/sec$^3$. However, it should be understood that each "general machining" configuration is machine dependent and that these exemplary values would only apply to certain types of machining centers, and are only included as examples of typical values for particular machines.

The user-enterable parameters also preferably include a start position indicating where the user would like the axis to begin just prior to the pre-load move, and a maximum end position indicating maximum axis position allowed during the excitation program The maximum end position limits the program from moving the axis beyond the specified point, so as to avoid collisions with other components in the system, or other system "crashes." The user enters a maximum feedrate at which the test will run. A minimum feedrate at which the test should be run can also be selected. If no value is entered, a value of 10% of the maximum feedrate can be used. This minimum feedrate should not be excessively low, as indicated above. Also, the user can select locations for placement of the other axes which are not being tested.

It is not necessary for the user to enter these values manually every time, as they can be saved as a configuration to be re-used by the auto-tuning excitation test.

Figure 4:
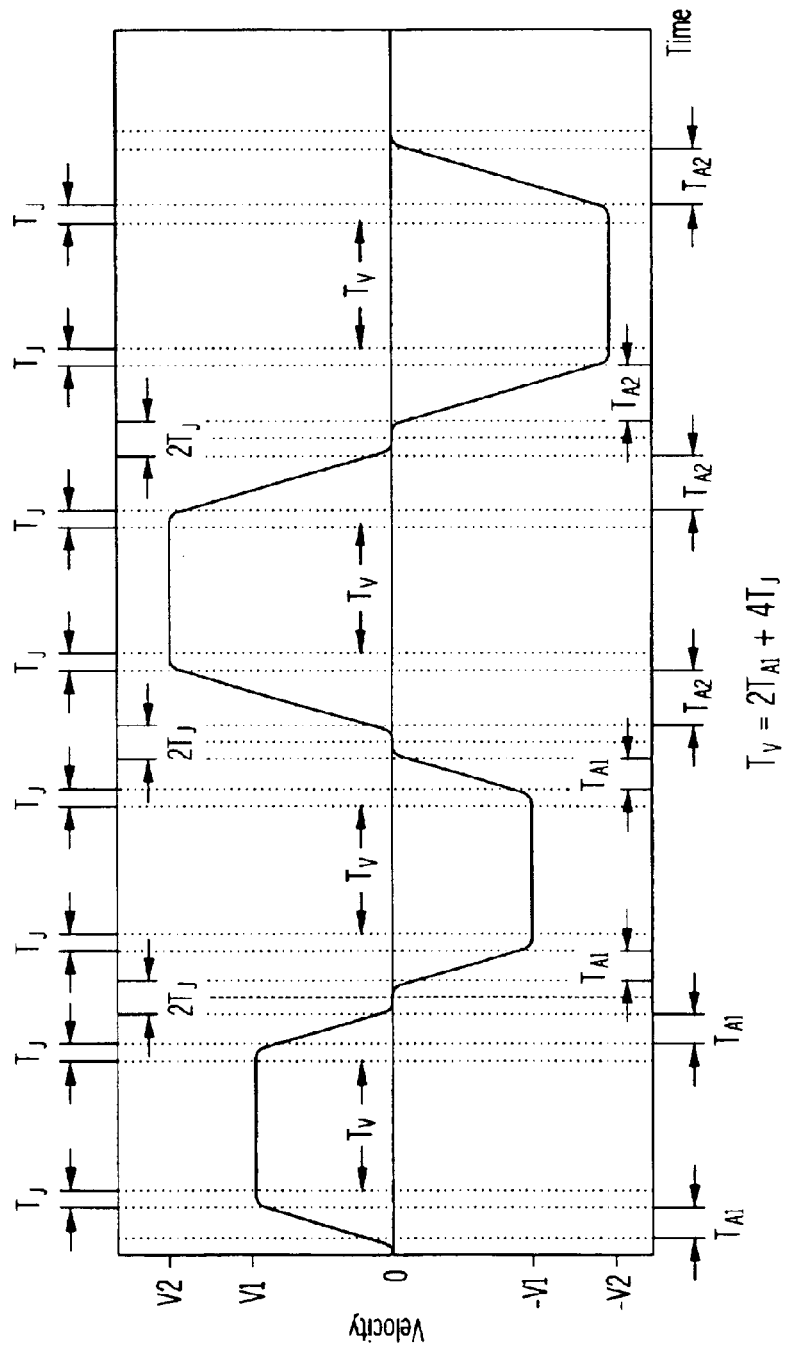
FIG. 4 is a velocity vs. time graph, illustrating an exemplary velocity command profile for an excitation part program for use in tuning feedforward parameters, according to one embodiment of the present invention.

It has been found that the preferred test motion routine is automatically derived by combining a series of forward and backward moves. FIG. 4 shows the velocity profile for two such axis moves. As can be understood by viewing FIG. 4, each pair of forward and backward moves preferably involves four motion blocks:

a motion block to command the axis to move to a target position at a specified velocity a motion block to ensure a full stop a motion block to command the axis to reverse and return to the original position at the specified velocity a motion block to ensure a full stop In the preferred embodiment, the excitation program is constructed by combining moves of this type for various velocities and move distances. The part program is preferably automatically generated based upon the following rules, which allow the program to avoid the undesirable operating conditions described above, as well as to conform to the parameters entered by the user.

Do not move to locations outside of the range specified by the user in the setup data.

Do not move to locations which are outside the machine's programmed range limits.

Do not attempt to collect more data than can fit into the data acquisition buffer.

The initial commanded axis move is to be at the user-specified minimum test velocity.

The final commanded axis move is to be at the user-specified maximum test velocity.

The distance traveled for minimum velocity move is determined such that constant velocity time equals the sum of the acceleration and deceleration time.

The distance traveled for all other moves is determined such that constant velocity time is equivalent to constant velocity time of the minimum velocity move.

The number of pairs of back and forth moves (i.e., "bi-directional" moves) can be set by the user as desired. Alternatively, this value can be preset for a particular number of pairs of moves, such as four pairs of moves, for example. The velocities for the moves are preferably equally spaced between the minimum velocity and the maximum velocity.

The amount of time at relatively high velocities should be approximately equal to the amount of time at relatively low velocities.

The amount of time the axis undergoes acceleration should be approximately equal to the amount of time the axis does not undergo an acceleration (i.e. remains at a constant velocity).

The amount of time moving the axis with a positive velocity should be approximately equivalent to the amount of time moving the axis with a negative velocity.

Application of feedforward commands should be disabled during the execution of the excitation test program.

It has been found that these rules can allow the derived program to avoid the undesirable or un-modeled situations which are described above, and to simultaneously conform to the parameters entered by the user. Such a program, it has been discovered, provides maximum excitation for the model.

Figure 5:
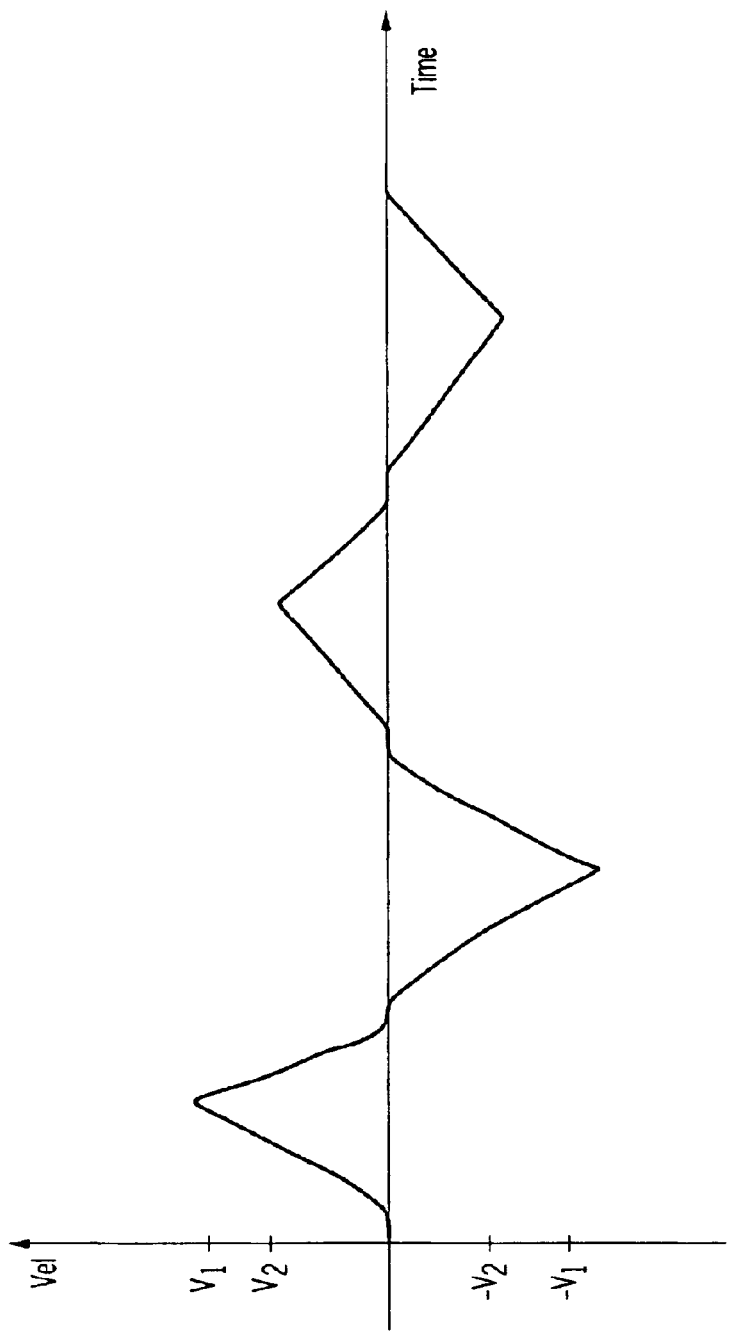
FIG. 5 is a velocity vs. time graph, illustrating an alternative velocity command profile for an excitation part program according to one embodiment of the present invention.

However, it is contemplated that other forward-backward excitation programs having velocity profiles other than that shown in FIG. 4 could be utilized without departing from the scope of the invention. For example, FIG. 5 illustrates a velocity profile for an alternative excitation program, wherein the axis is moved back and forth to decreasing maximum velocities at decreasing acceleration rates.

Once the excitation program is automatically generated, a "preview" mode can be utilized in order to test the excitation program before actually undertaking data acquisition. This mode of operation preferably only moves the axis through the maximum velocity moves specified in the generated program, so that the entire motion sequence need not be executed. Such a preview mode allows the user to determine whether the excitation program will cause a collision. Data acquisition can be disabled during the preview run.

a. Computation of the Constant Velocity Time for All Moves

As discussed above with respect to FIG. 4, it is preferred that the length of the minimum feedrate move is such that the total amount of time spent accelerating and decelerating is equal to the amount of time spent at constant velocity. Referring to the left most pulse in FIG. 4, the constant velocity time $T_v$ should be equal to the total acc/dec time $4*T_J$, $+2*T_{AI}$, where $T_J$ is the amount of time spent in the constant jerk regions and $T_{AI}$ is the amount of time spent in the constant acceleration regions. The following equations can be used to implement these constraints.

The time spent in the constant jerk region is preferably based on the maximum axis acceleration and jerk allowable for the axis to be tested.

$$T_J = \frac{\max\_acc}{\max\_jerk} \tag{36}$$

Accordingly, the change in velocity through the constant jerk region is:

$$V_J = \frac{1}{2} * \max\_jerk * T_J^2 \tag{37}$$

The time spent in constant acceleration for the minimum programmed feedrate $V_1$ is $T_{AI}$ and can be calculated as follows:

$$T_{AI} = \begin{cases} \frac{V_1 - 2*V_J}{\max\_acc}, & V_1 \geq 2*V_J \\ 0, & V_1 < 2*V_J \end{cases} \tag{38}$$

Then, the constant velocity time can be set such that it is equal to the acceleration time plus deceleration time.

$$T_V = 2*T_{AI} + 4*T_J \tag{39}$$

If the minimum programmed velocity $V_1$ is less than $2*V_J$, the velocity $V_1$ will generally be too low to allow constant acceleration to be attained. If this is the case, $T_{AI}$ can be assumed to be zero. and the constant velocity time can then be set to four times the constant jerk time. The result will be that for the minimum feedrate move, the constant velocity time is longer than the constant jerk time. In addition, in the preferred embodiment, if the computed constant velocity time is less than a hard-coded lower limit (e.g., 0.25 seconds), then it is set to be equal to this lower limit.

b. Generation of Motion Blocks for Axis Excitation

Once the acceleration and constant velocity times are calculated, the algorithm can proceed to automatically generate the motion blocks for the excitation program. Each back and forth motion has a different constant velocity region, which is between the minimum user-programmed velocity and the maximum user-programmed velocity. These various velocities and the total length of the move for each of the various velocities can be generated in a loop. In the loop, the loop index n preferably begins as zero and is incremented until it reaches the specified number of moves, which can be entered by the user, or, even more preferably, hardcoded to a particular number, such as four, for example.

More specifically, the velocities can be distributed linearly between the minimum programmed feedrate and the maximum programmed feedrate based upon the number of moves:

$$V_n = V_{MIN} + n * \frac{V_{MAX} - V_{MIN}}{num\_moves - 1} \tag{40}$$

The acceleration time $T_{An}$ for each velocity can then be calculated as:

$$T_{An} = \begin{cases} \frac{\frac{V_n}{60} - 2*V_J}{A}, & \frac{V_n}{60} \geq 2*V_J \\ 0, & \frac{V_n}{60} < 2*V_J \end{cases} \tag{41}$$

Once the acceleration time is known, the length of the move (i.e. how far the axis will move for the particular velocity) can be calculated based upon the constant velocity time $T_v$, the velocity $V_n$, and the acceleration time $T_{An}$:

$$L_n = 2V_J T_{An} + A T_{An}^2 + 2V_n T_J + V_n T_V \tag{42}$$

Once the length of the move is known, the destination position for the particular back-and-forth move can be determined. The destination position for move n can be given the symbol $X_n$ and the initial position prior to the excitation moves (and after the pre-load move) can be given the symbol $X_i$.

The direction of the first move depends on whether the user-specified maximum end position is greater or less than the user-specified start position. A variable s can be computed for this purpose:

$$s = sgn(max\_end\_position - start\_position) \tag{43}$$

The destination position can then be computed by adding the product of s and move length $L_n$ to the initial position $X_i$. If the destination position is beyond either the maximum end position specified in the setup data or the high or low limit for the particular machine, then the destination position is assigned to the most limiting of these two constraints.

$$X_i = start\_position + s \times PRELOAD\_MOVE \tag{44}$$

$$X_n = \begin{cases} X_i + s \times L_n, & ((X_i + sL_n) < high\_limit) \, \& \\ & ((X_i + sL_n) > low\_limit) \, \& \\ & (s(max\_end\_pos - (X_i + sL_n)) < 0) \\ high\_limit & (high\_limit < (X_i + sL_n)) \, \& \\ & (high\_limit < max\_end\_position) \\ low\_limit & (low\_limit > (X_i + sL_n)) \, \& \\ & (low\_limit > max\_end\_postion) \\ max\_end\_pos, & otherwise \end{cases}$$

As shown in FIG. 4, the motion blocks themselves command a move to the destination position, a no-motion span or "dwell" to ensure that the velocity profile ends in a full stop, a move back to the initial position, and another no-motion span or "dwell." The dwell size is preferably less than a BPI to minimize the amount of time the axis spends stopped. An example motion block for the case where the X axis is exercised is shown below in machine tool code. In the block, the variable $X_i$ indicates the starting position for the axis, the variable $X_n$ can be obtained through equation (44), and the variable $V_n$ can be obtained through equation (40). The variable bpi is the predefined basic process interval for the control (e.g., 3 milliseconds, 5 milliseconds).

G90 G1 X<$X_n$>F<$V_n$>

G4F<bpi/2>

G90 G1X-<$X_i$>F<$V_n$>

G4F<bpi/2>

Preferably, four back-and-forth moves are made using four such motion blocks, with the first move being at the specified minimum velocity and the fourth move being at the specified maximum velocity. The subscript n is an index indicating which move in the sequence is referenced.

c. Flow Diagram

Figure 6:
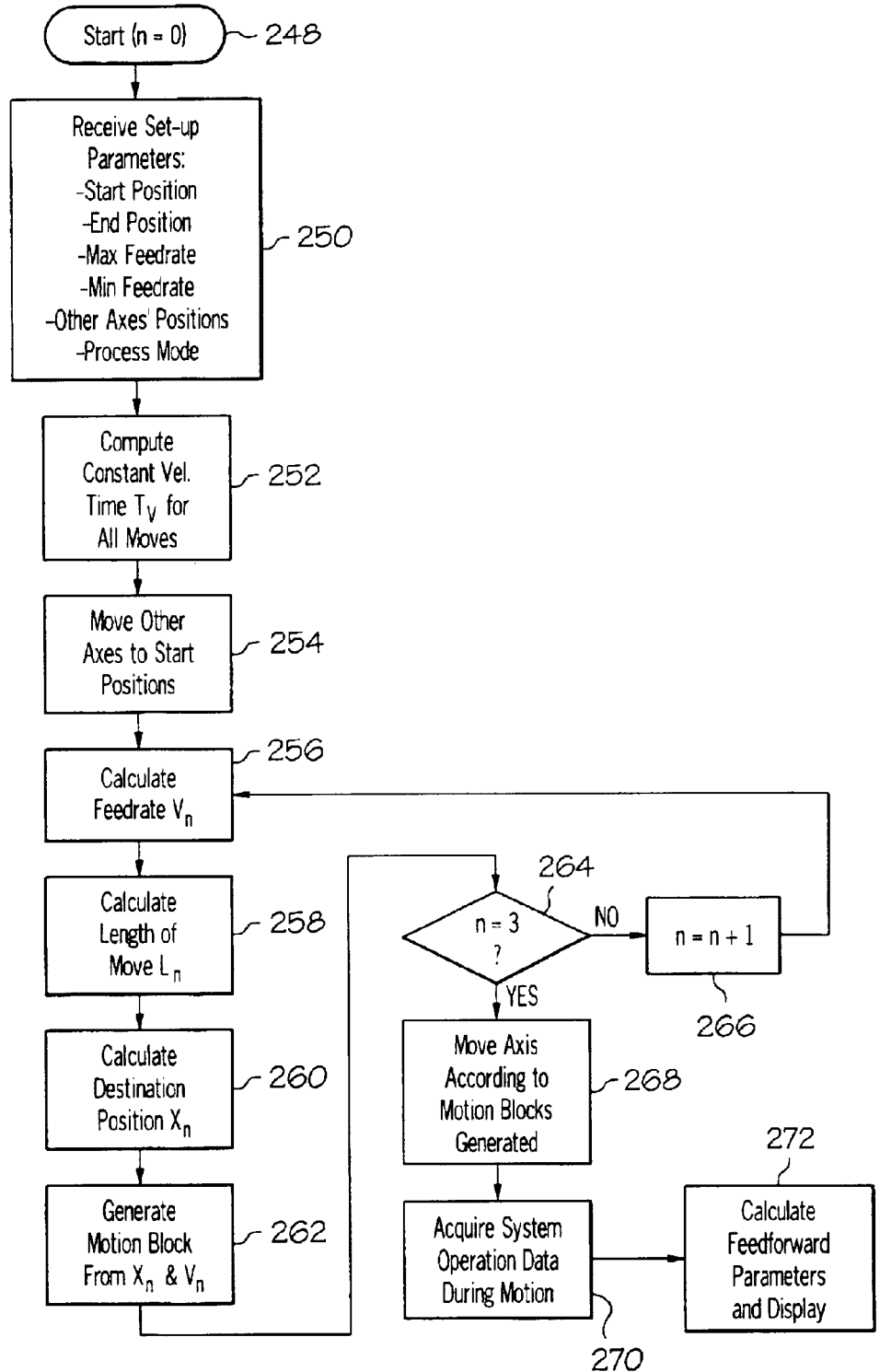
FIG. 6 is a flow diagram illustrating an exemplary method for automatically generating an excitation part program for use in automatically tuning feedforward parameters, according to one embodiment of the present invention.

FIG. 6 is a flow diagram illustrating the preferred method for automatically generating the excitation program, as discussed above. At step 248, the process is commenced, and the loop index n is set equal to zero. Then, at step 250, the user-definable parameters are obtained, preferably via a graphical user interface implemented on a workstation which is a part of the CNC, or from an existing database where the values are stored permanently. As discussed above, these parameters can include the starting position for the axis to be tuned, the maximum end position for the axis, the maximum and minimum feedrates, other axes' positions, and process mode, to be used for the tuning.

Once the parameters are entered by the user, the constant velocity time $T_v$ (the amount of time during which the axis will travel at a constant velocity, for each velocity being tested) is calculated. This is represented as step 252 and can be implemented via equations (36) through (39) above. As noted, it is preferred that this constant velocity time $T_v$ is set equal to the total acceleration and deceleration time for the given backward or forward movement.

Once the constant velocity time is computed, step 254 is executed and the other axes, which are not being tuned, are moved to their collision-avoidance positions, which can be specified by the user at the set-up step. This is done to move the other axes out of the way to avoid collisions.

Steps 256 through 266 make up a loop, based upon the loop index n, which determines each of the various feedrates (i.e. velocities) $V_n$ which will be reached during the excitation program, as well as each of the various destination points $X_n$ to which the axis will move during each back-and-forth movement of the program. V1 and V2 of FIG. 4 are examples of two of the velocities $V_n$ which are reached during the program.

In particular, each velocity $V_n$ is calculated at step 256. This calculation can be made through use of equation (40) above. Once the velocity is determined for the particular iteration of the loop, the length of the move $L_n$ is calculated, at step 258. This calculation can be made through use of equations (41) and (42) above. Based upon the calculated move length $L_n$ and the velocity step $V_n$ for the loop iteration, the destination position can then be determined, at step 260. This calculation can be made through use of equation (44) above.

Then, at step 262, a motion block (e.g., a series of commands) can be generated for the $X_n$ and $V_n$ which were calculated. An exemplary motion block is discussed above.

At decision step 264, it is determined whether the loop index has reached three (such that the preferred number of four back and forth movements are utilized). If not, the loop proceeds to step 266, wherein the index n is incremented by one. Then, the loop continues back to step 256, wherein the next back-and-forth motion block can be generated for the next incremental velocity $V_n$.

If the loop index n does equal three, then the process proceeds to step 268, and the excitation program is ready for operation. At this step, the part program is executed by the CNC control and the axis moves back and forth four times according to the four motion blocks, and reaches an ever increasing velocity $V_n$ each time. During this excitation program, step 270 is executed and system operation data (e.g., velocity measurements and corresponding torque commands) is acquired by the CNC during the program. After the test program is complete, step 272 is executed, and the feedforward parameters are estimated and displayed. Preferably, the method of FIG. 3 is utilized to calculate these parameters. The proposed feedforward parameters can then be viewed by the user and accepted or rejected. The condition number, excitation number, and/or coherence value, which are discussed in detail above, can be utilized for this purpose.

IV. Tuning Additional Feedforward Parameters.

Application of feedforward to more complex machines may require that the complexity (order) of the model describing the axis dynamics be increased. Accordingly, it is contemplated that at least the following model enhancements could be utilized.

Several phenomena which are not included in the present implementation of the feedforward model may result in torques applied to the motor. Some of these phenomena include:

Position dependent Coulomb friction

Static friction

Compliance of machine components

In order to implement the least squares solution as described in the previous model, these phenomena would have to be expressed as a linear scaling of some basis function which is completely determined by the data acquisition measurements.

A. Position Dependent Coulomb Friction

Changes in the Coulomb friction level associated with a controlled axis may occur with the position of the axis. This effect could be caused by any number of factors. One possible cause is misalignment between the ballscrew and ways resulting in binding. One way of describing position dependent Coulomb friction is to express the Coulomb friction level as a polynomial in axis position. A second order polynomial would allow for several types of position dependence: 1) an increase in friction as the axis position varies from one end of its range to the other, 2) a decrease in friction near the center of the range and increase in friction near the ends of the range, 3) an increase in friction near the center of the range and a decrease near the ends. If the Coulomb friction level for the X-axis is expressed as a second order function of X:

$$T_{fc} = a_2 X^2 + a_1 X + a_0 \tag{45}$$

then the Coulomb friction applied to the axis would be expressed by:

$$T_{fc}{}^x\text{Sign}(V) = a_2 X^2 \text{Sign}(V) + a_1 X \text{Sign}(V) + a_0 \text{Sign}(V) \quad (46)$$

This position dependence can be included in the preferred model described above by inserting the matrix form of equation (46) into equation (10) as follows.

$$\begin{bmatrix} \frac{dV(t_1)}{dt} & V(t_1) & X(t_1)^2 \frac{V(t_1)}{|V(t_1)|} & X(t_1)\frac{V(t_1)}{|V(t_1)|} & \frac{V(t_1)}{|V(t_1)|} & 1 \\ \frac{dV(t_2)}{dt} & V(t_2) & X(t_2)^2 \frac{V(t_2)}{|V(t_2)|} & X(t_2)\frac{V(t_2)}{|V(t_{n2})|} & \frac{V(t_1)}{|V(t_2)|} & 1 \\ \vdots & \vdots & \vdots & \vdots & \vdots & \vdots \\ \frac{dV(t_n)}{dt} & V(t_n) & X(t_n)^2 \frac{V(t_n)}{|V(t_n)|} & X(t_n)\frac{V(t_n)}{|V(t_n)|} & \frac{V(t_n)}{|V(t_n)|} & 1 \end{bmatrix} \begin{Bmatrix} J \\ B \\ a_2 \\ a_1 \\ a_n \\ T_{cmd} \end{Bmatrix} = \quad (47)$$

$$\begin{Bmatrix} Tcmd(t_1) \\ Tcmd(t_2) \\ \vdots \\ Tcmd(t_n) \end{Bmatrix}$$

B. Static Friction

A simple model for static friction or "stiction" is the torque which must be exerted on the axis in order for the axis to break-away from a resting position. If stiction is present, then it may exhibit a behavior whereby the motor exerts a residual torque on the axis in order to maintain the at rest position of the axis. This torque is the result of stiction combined with compliance. In particular, as the axis slows down to a stop, at some critically slow velocity it will "stick" and come to a complete stop. At this point, the axis may not have reached its final position and some small following error may remain. Any such following error results in a velocity command, which results in a torque command which is steadily increased in time by the integrator.

At first, before the integrator has built up, the following error will result in a proportional motor torque. This torque will be opposed by the static friction torque in combination with the stiffness of the axis components between the motor and the location where the stiction force is applied. Torque is also affected by the inertia of this portion of the structure. If the stiffness is low, i.e. compliance is high, then the residual motor torque will be low, and the majority of the following error will be taken up by compliance. If the stiffness is high, then the residual torque will be closer to the stiction level and the following error will remain at its initial level. With the passage of time, the integrator will begin to build up, resulting in increased motor torque, resulting in reduction of following error through compliance of the structure between the "stuck" component and the axis motor. Thus, the residual following error will be reduced to zero in the presence of an integrator.

Assuming that the integrator torque builds up enough to remove the residual following error without causing the stuck element to break away, at steady state there will be a torque command opposed by the stiffness of the structure between the motor and point of stiction. This level of torque can be obtained by including a column in the matrix of equation (10) which contains a zero when the axis is in motion, a 1 when the axis is at rest and most recently experienced a positive velocity, and a −1 when the axis is at rest and most recently experienced a negative velocity.

C. Structural Compliance

Methods for obtaining the natural frequencies of structural vibrations due to compliance are available and can be incorporated into the model. In particular, the axis can be modeled as consisting of multiple inertias and the discrete difference approach for acceleration can be dropped and replaced by use of shift operators (Z-transform methods).

D. Diagnosing Machine Health

It is also contemplated that the present invention can be utilized to diagnose the health of a particular machine. For example, the automatic parameter estimation program can be executed periodically and the values derived compared to the values previously derived for the machine (e.g., the parameter "history"). If the difference between a newly estimated parameter and the previous values estimated for the parameter is statistically significant, or exceeds a predetermined safe threshold, then a machine problem could be present.

V. Hardware Implementation

Figure 7:
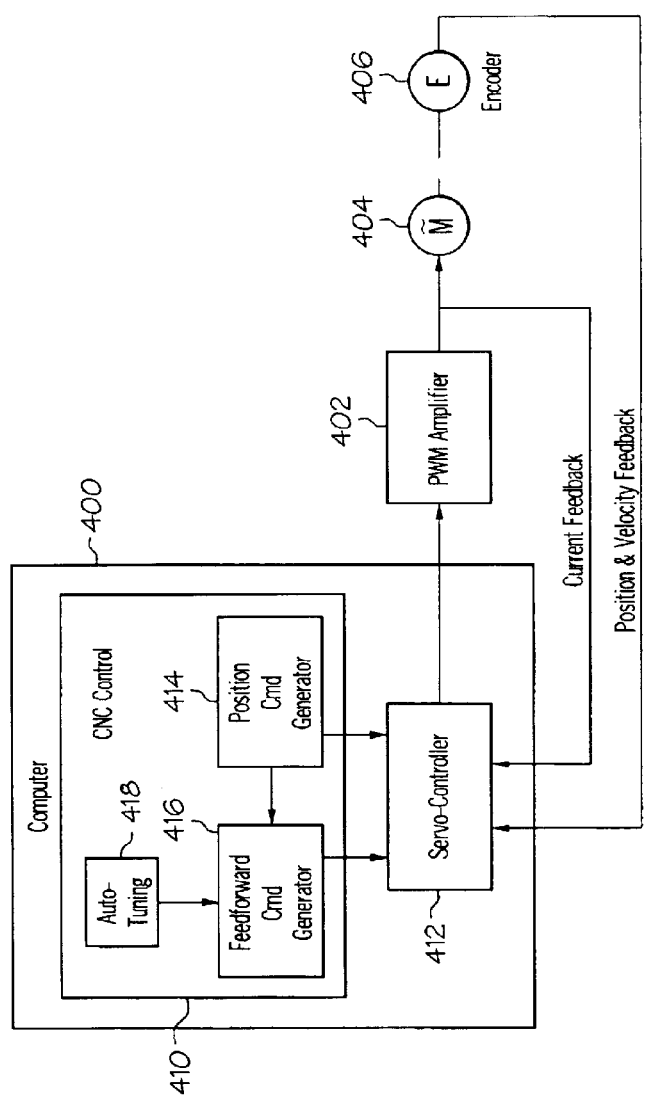
FIG. 7 is a structural block diagram schematically illustrating an exemplary embodiment of an automatic feedforward tuning method and apparatus according to one embodiment of the present invention.

FIG. 7 is a block diagram illustrating a potential hardware configuration for implementing the above-described feedforward control system having automatic tuning capabilities. The illustrated system is microprocessor based and includes a computer 400 having a CNC control unit 410 and a servo controller unit 412. The CNC control unit 410 includes a position command generator 414 which provides position commands based upon the part program to the servo-controller 412 and to a feedforward command generator 416. Based upon the position commands and feedforward gains, the feedforward command generator then provides feedforward commands to the servo-controller 412.

The CNC 410 also includes an automatic tuning unit 418 for tuning the feedforward parameters which are utilized by the feedforward command generator 416 to derive feedforward commands. Preferably, the auto-tuning unit 418 operates as discussed above, and preferably includes capability for automatic generation of the excitation program based upon data provided by the user through an input device on the computer 400.

From the position commands, feedforward commands, and feedback measurements, the servo-controller 412 then generates the voltage command signals to be fed to a PWM (pulse width modulation) amplifier 402. The servo-controller 412 preferably includes position, velocity, and current feedback loops and commutation functions for producing the voltage commands, such as those described above with respect to FIG. 1. The servo-controller 412 and PWM amplifier 402, along with a current measuring device for measuring the current from the amplifier, form a current control loop, as shown in FIG. 7.

The voltage commands from the servo-controller 412 control the PWM amplifier 402. The three-phase voltages are switched via the PWM amplifier 402 to the AC electric motor 404. The value of the developed three phase currents are detected and fed back to the servo-controller 412 in the current control loop configuration. In response to the three phase currents, the motor 404 is rotated and a movable member connected to the motor 404 is moved. An encoder 106 is used for determining the position and velocity of the motor, which are fed back to the servo-controller 412. The auto-tuning unit 418 preferably utilizes a velocity estimate based upon velocity measurements from the encoder 106, as well as the torque commands from the servo-controller 412 to automatically derive the feedforward gains, as discussed previously.

As can be understood, the automatic-tuning unit 418, the feedforward command generator 416, and the position command generator 414 be embodied as a program or programs on a computer readable medium, such as a ROM unit, or other persistent storage medium. These units can also be embodied as special purpose apparatus having executable instructions stored in a RAM or ROM, or a combination of both. Moreover, the instructions and/or programs can be implemented in any conventional programming language, such as, for example, C, or C++, or can be implemented in a special purpose programming language. Preferably, the C programming language is utilized. Similarly, many of the functions of the servo-controller 412 can be carried out according to programmed instructions.

A. Analog Interface Between the CNC and Servo-Controller

Figure 8A:
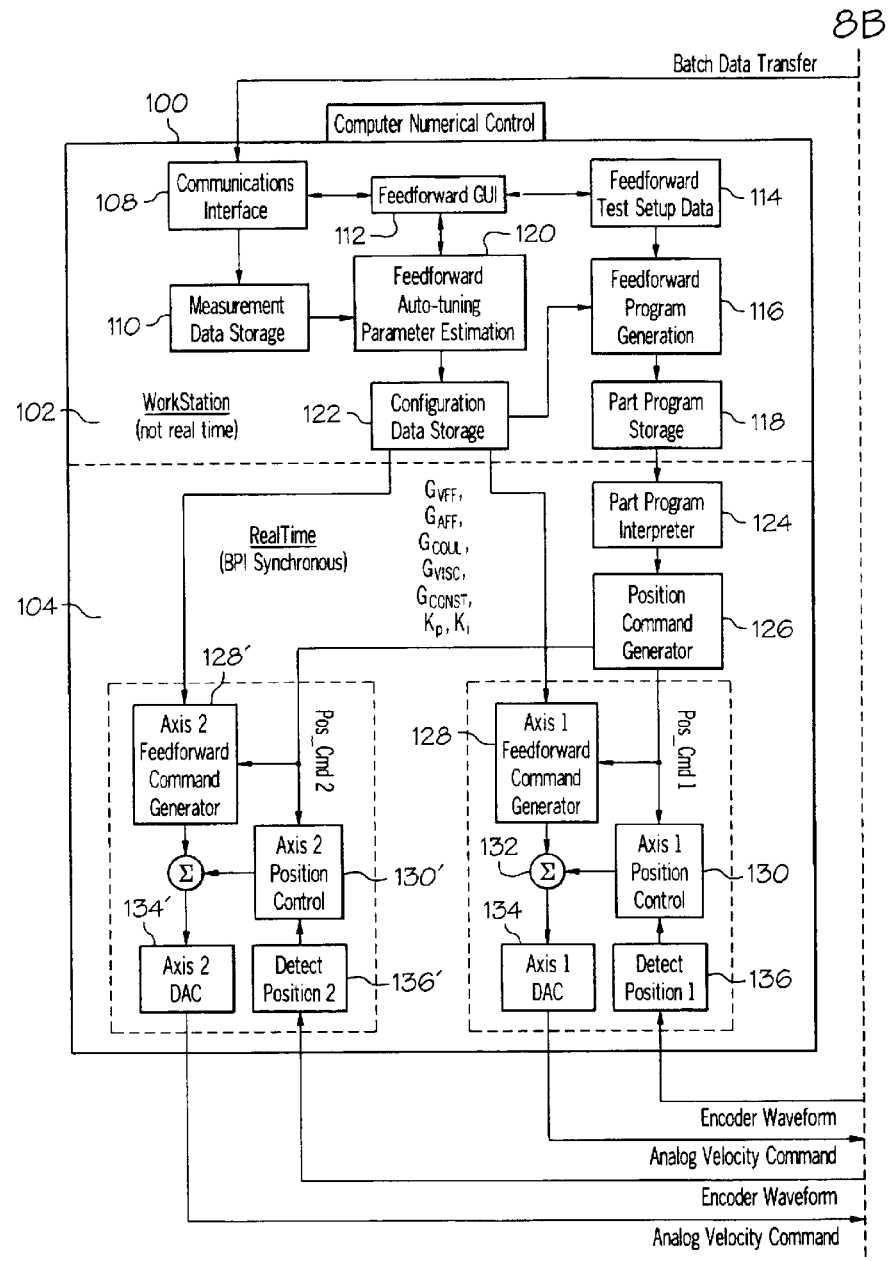
FIG. 8 is a structural block diagram schematically illustrating an alternative embodiment of the present invention, wherein a CNC and servo drive are interfaced by an analog connection, and wherein the parameters required to allow such a configuration are tuned in accordance with one embodiment of the present invention.
Figure 8B:
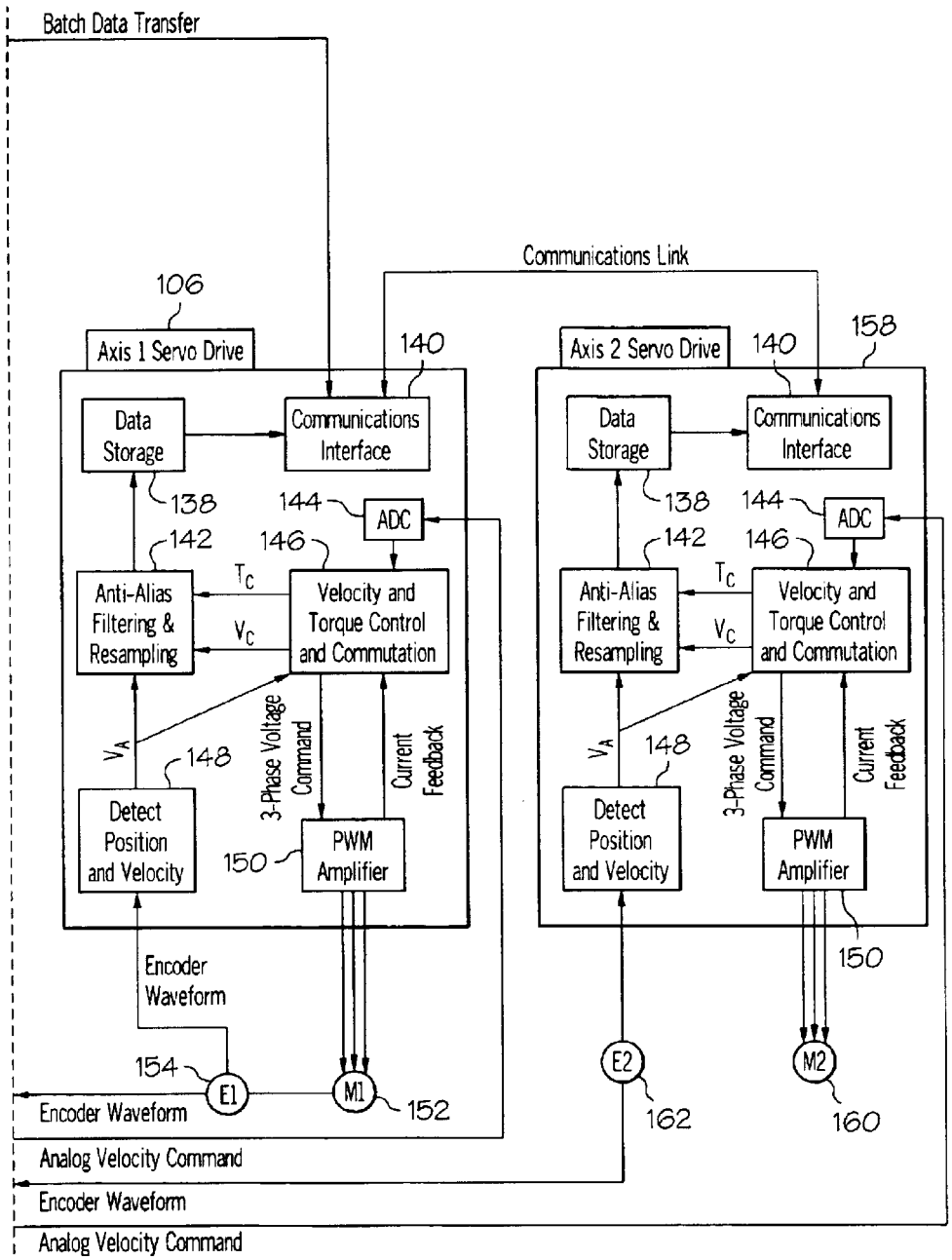
Figure 10:
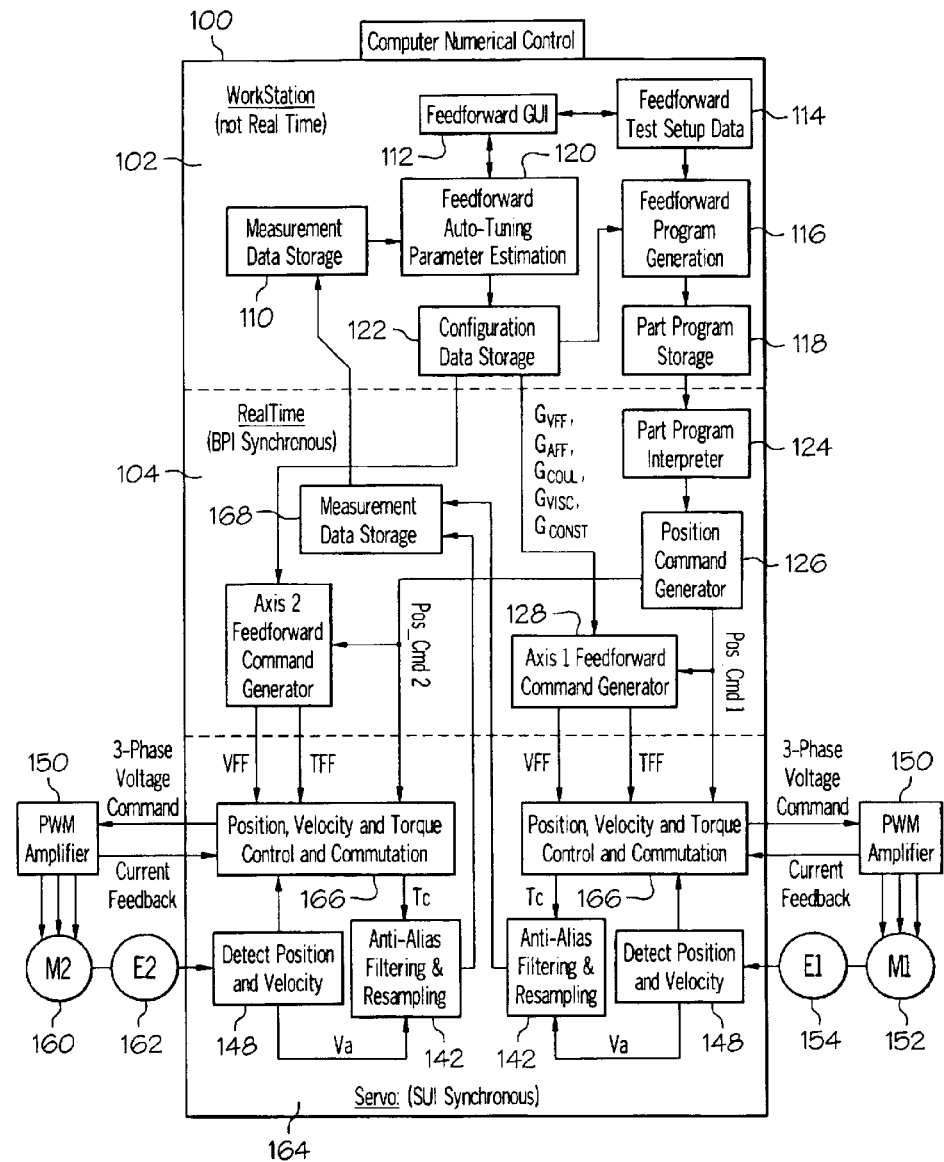
FIG. 10 is structural block diagram schematically illustrating another embodiment of the present invention, wherein a CNC and servo drive are interfaced by a digital connection.

As shown in FIGS. 8 and 10, the present invention may be implemented on control systems with an analog interface between the CNC and servo, or systems with a digital interface between the CNC and servo.

FIG. 8 shows an embodiment where feedforward auto tuning is implemented on a system with an analog interface between the CNC and servo. In this embodiment, CNC controller 100 incorporates two independent processes: a real time process 104 and a non-real-time workstation process 102. Each process can operate on a separate computer subsystem, if desired. However, embodiments where both processes are executed on the same computer (CPU) are also included within the scope of the implementation shown in FIG. 8.

Within the workstation process 102 is stored configuration data 122 that specifies, among others, the parameters for axis motion, such as acceleration and jerk, for example. The feedforward generation function 116 uses this configuration data along with auto tuning test setup data 114 in order to generate the excitation part program which is loaded into the part program storage area 118.

In the embodiment of FIG. 8, program execution takes place on the real time system where the part program interpreter 124 generates geometric data that is provided as an input to the position command generator 126 (also known as an interpolator) which outputs a new position command for each axis every BPI.

FIG. 8 shows an example of a system of two axes actuated by motors 152 and 160 which are powered by servo-drives (i.e., controllers) 106 and 158, respectively. It should be understood that, while two axes are shown in the example, any number of axes may be present without changing the nature of the system.

The position command generator 126 outputs multiple position commands every BPI—one for each axis under active control. Considering just one axis, and with the understanding that the forthcoming description can pertain equally to any axis under control, the position command generated each BPI is operated on by the axis position control function 130 and the axis feedforward command generator 128. The axis position control function receives the axis feedback position from the position detection function 136. The axis position control function 130 and the feedforward command generator function 128 both output a velocity command. The two velocity commands are added together by a summing function 132, and the total velocity command for each BPI is converted to a voltage output by the digital to analog converter 134. The analog output voltage is then applied as input to the standalone axis servo drive 106 attached to the axis under control.

The servo drive 106 comprises an analog to digital converter or ADC 144, which converts the analog signal into a digital representation of the velocity command. The servo drive's ADC 144 performs analog to digital conversion periodically at a uniform time interval that is typically shorter than the CNC's BPI. The servo drive's time interval for analog to digital conversion is typically equal to the time interval for velocity control and is referred to herein as the minor update interval. The required velocity is applied to the velocity-control/torque-control/commutation function 146. The velocity-control function of block 146 requires velocity feedback and typically receives velocity feedback from the position and velocity detection function 148. To provide this velocity feedback, the position and velocity detection function 148 receives a signal from a feedback device such as an encoder 154 attached to the motor shaft, and the encoder signal is interpreted by block 148 in order to provide a measurement of motor angle and motor velocity.

Using the velocity control output, block 146 produces a required torque or torque command which is provided as input to a torque control loop, also within block 146. To perform this torque control function, block 146 requires current measurements, which can be provided by a sensor within the PWM (pulse width modulation) amplifier 150.

In addition to torque and velocity control, function block 146 also performs a commutation function in the embodiment of FIG. 8. To perform this function, motor angle data is required, and is provided by the position and velocity detection function 148. The primary output of the velocity-control/torque-control/commutation function block 146 is a three phase voltage command which represents the required voltage on each of three windings of the synchronous AC servo-motor 152. As can be understood, a DC servomotor may be substituted for the AC servo motor 152, and only a single phase voltage command would then be required.

As is known in the art, the voltage command (either single or three phase) from block 146 is provided to the PWM amplifier 150, which uses switching techniques to produce the required voltage or voltages on the armature winding or windings of motor 152.

Although the interface to the servo drive 106 is analog, the servo drive is itself a digital device that controls velocity at equal time intervals referred to as the "minor update interval." This update time is typically a smaller period of time than the BPI, often 4 to 20 times as small. This document uses $t_m$ to denote the minor update interval of the velocity servo 106.

As the feedforward auto tuning excitation program is executed and axis motion is generated, the required data for making the parameter estimations can be stored in memory 138 on the standalone servo drive 106. As discussed herein with respect to the automatic tuning invention, this data can include the velocity command, velocity feedback, and torque command. In one embodiment, data from every minor update interval during execution of the test program can be stored in the drive's on-board data storage 138. Another possibility would be to store re-sampled data in the on-board data storage 138. "Resampling" data is the process of collecting data every n minor update intervals, where n is a constant integer. If this approach is used, in order to avoid the effects of aliasing, the original data, gathered once per minor update interval, should first undergo a process of digital anti-alias filtering where the majority of the signal's energy content that resides in a frequency range that is above half the resampling frequency is removed from the signal. The process of anti-alias filtering and resampling is illustrated in FIG. 8 by block 142.

Once execution of the test program has completed, the feedforward graphical user interface (GUI) 112 of the workstation 102 causes the CNC's communications interface 108 to retrieve the data from the communications interface 140 of the servo drive 106. The communications interface 108 might incorporate a serial communications protocol as one possible embodiment. Also, multiple servo-drives can be networked together using a suitable network topology such as a ring, a web, or a multi-drop.

Once the data is retrieved from the servo-drive 106, the CNC 100 can store the data in its own measurement data storage area 110. Once all the required data from all the required drives has been retrieved, the feedforward auto tuning parameter estimation function 120 operates on the measurement data in storage area 110 and computes the feedforward parameters for each axis, such as by using the Newton's law equations and matrix solutions methods described above. These feedforward parameters can then be displayed on the feedforward GUI 112 to allow the user to decide whether or not to accept them. If the user accepts the parameters, they can be written to the configuration data storage area 122. The real time feedforward command generator 128 can then use the data stored in 122 as the feedforward gains, as described above.

As shown in FIG. 8, the analog interface system requires two additional parameters to be tuned by the automatic tuning invention, in addition to the parameters previously discussed ($G_{VFF}$, $G_{AFF}$, $G_{COUL}$ $G_{VISC}$, $G_{CONST}$). In particular, implementation of integrated feedforward on a so-called "analog servo interface" system may be accomplished if precise estimates of the velocity loop compensator's parameters are known. As described above, the velocity command voltage in FIG. 8 is applied to a stand-alone servo drive 106 that attempts to cause a motor 152 to move with the commanded velocity by use of a closed velocity loop. The closed velocity loop most often contains a PI compensator whose input is an error between a command velocity and a measured velocity (feedback velocity) and whose output is a torque command. Thus, because the input to the servo 106 is a velocity command only, and not a velocity and separate torque command, a requirement of accomplishing integrated feedforward on a system with an analog servo interface having only a velocity input is that the torque feedforwards are transformed into velocity feedforward. This can be accomplished by a filter that closely approximates the inverse dynamics of the PI compensator used by the velocity control loop of block 146. Thus, a high precision estimate of the PI compensator's parameters is required to perform the filtering. The way in which these parameters are used by the compensator is described below.

These compensator parameters are $K_P$—the proportional gain and $K_I$—the integral gain. Because these parameters enable feedforward to operate on the exemplary system of FIG. 8, they are considered feedforward parameters. In certain systems, the servo drive's internal representation of the velocity loop parameters are scaled specifically to the servo drive. Often, the CNC controller 100 doesn't have enough information about the servo drive's 106 configuration and internal software to be able to represent the parameters in the required way. This problem is solved by another aspect of the automatic tuning program of the present invention, in which the values of the velocity loop parameters are estimated via analysis of measured data.

As discussed above, standalone digital servo drives can have the ability to store historical data regarding the command and feedback signals from previous minor update intervals (see data storage block 138 of FIG. 8). This data may be delivered to the feedforward auto tuning capability 120 that is resident on the control 100 by some communication interface (108 and 140), such as an RS232 interface. The data can be transferred as a non-real time process after the test motion has been completed. On the CNC 100, the data can then be used to estimate the inertia, Coulomb friction, viscous friction, and constant offset. The methods for estimating these parameters by analyzing torque command and velocity feedback data have already been described, such as with reference to FIG. 3, for example.

In order for the auto-tuning algorithm 120 of FIG. 8 to also estimate the velocity loop compensator parameters ($K_P$ and $K_I$) it has been found that the velocity command signal can be measured and utilized, in addition to the torque command and velocity measurements. In one preferred approach, measurements of the velocity command signal are made over an interval that is equivalent to the CNC's BPI. In order to avoid data corruption by aliasing, the data is preferably digitally filtered on the drive 106. Digital filtering and re-sampling may be performed by the drive 106 in real time in order to reduce the memory requirement for storing the data on the drive.

In particular, the following discussion describes a technique for estimating the velocity loop parameters $K_P$ and $K_I$ from measurements of the torque command Tc, the velocity feedback Va, and the velocity command Vc, according to another aspect of the automatic tuning method and apparatus of the present invention. The sampling interval for these measurements is $t_s$ and is preferred to be equal to the BPI T, but this is not a requirement for the algorithm to work properly. For cases where the sampling time is greater than the minor update interval of the velocity loop, i.e. $t_s > t_m$, the digital filter representation of the velocity loop compensator is expressed in terms of the discrete time domain variable for a sampling interval $t_s$: $z = \exp(st_s)$. The digital filter is preferably derived based on the bilinear transform. The derivation of the digital filter equation begins by defining the form of the continuous time representation velocity loop compensator. This is shown in FIG. 9.

Figure 9:
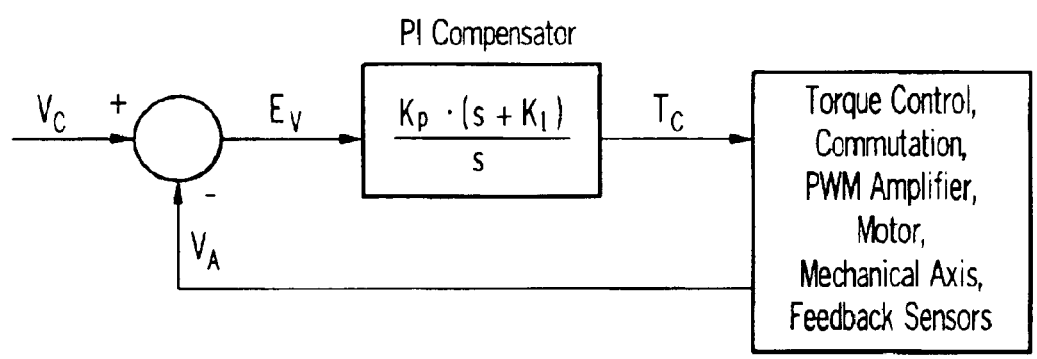
FIG. 9 is a control system block diagram illustrating the function of the PI compensator of the system of FIG. 8.

With reference to FIG. 9, according to one embodiment of the present invention, the parameters of the PI compensator are automatically estimated by investigating the relationship between the velocity error $E_V$ and the torque command $T_C$. The velocity error for time sample number k is computed by subtracting the velocity feedback measurement from the velocity command measurement for the time sample k.

$$E_V(k) = V_C(k) - V_A(k)$$

The PI compensator must be represented as a discrete time equivalent in order to determine its parameters from discrete time data. The bilinear transform is used to create the discrete time equivalent. The bilinear transform is defined below.

$$s \Leftrightarrow \frac{2}{t_s} \cdot \frac{1-z^{-1}}{1+z^{-1}}$$

Application of this transform to the PI compensator yields the following discrete time representation of the velocity loop compensator, which is denoted by D(z).

$$D(z) \approx \frac{T_C(z)}{E_V(z)} = \frac{K_P}{2} \cdot \frac{((K_i \cdot t_s + 2) + z^{-1}(K_i \cdot t_s - 2))}{1 - z^{-1}}$$

The difference equation associated with the previous digital filter is the following, which relates torque commands to velocity error. Because the torque commands and velocity error can be measured, the two unknowns, $K_p$ and $K_i$, can be found.

$$T_C(k) - T_C(k-1) = \frac{K_P}{2}(K_i \cdot t_s + 2) \cdot E_V(k) + \frac{K_P}{2}(K_i \cdot t_s - 2) \cdot E_V(k-1)$$

Formulating the previous equation at each time point and representing the equation in matrix form, provides the following matrix equation of an overdetermined system with N>>2 measurements.

$$\left\{ \begin{array}{c} T_C(2) - T_C(1) \\ T_C(3) - T_C(2) \\ \vdots \\ T_C(N) - T_C(N-1) \end{array} \right\} = \left[ \left\{ \begin{array}{c} E_V(2) \\ E_V(3) \\ \vdots \\ E_V(N) \end{array} \right\} \left\{ \begin{array}{c} E_V(1) \\ E_V(2) \\ \vdots \\ E_V(N-1) \end{array} \right\} \right] \cdot \left\{ \begin{array}{c} r_1 \\ r_2 \end{array} \right\},$$

where $\begin{cases} r_1 = \dfrac{K_P}{2} \cdot (K_i \cdot t_s + 2) \\ r_2 = \dfrac{K_P}{2} \cdot (K_i \cdot t_s - 2) \end{cases}$ This overdetermined system can be solved for r1 and r2 using techniques such as the normal equations or singular value decomposition methods described above. The coherence and condition number may also be determined using techniques completely analogous to those discussed earlier. In computation of the condition number, scaling of the EV matrix is not necessary because both columns have identical units. The condition number that indicates sufficient excitation for computing $K_p$ and $K_I$ is not necessarily the same value as the condition number that indicates sufficient excitation for computing the torque feedforward parameters.

Once values for r1 and r2 are obtained, the estimates for the PI compensator parameters are obtained from the following equations.

$$K_P = \frac{r_1 - r_2}{2}, \quad K_i = \frac{r_1 + r_2}{K_P \cdot t_s}$$

Thus, according to another aspect of the present invention, the compensator parameters can be automatically estimated to allow for the implementation of a feedforward system on a hardware implementation utilizing an analog interface between the CNC and servo-drive. These compensator parameters can be found by recording torque commands, velocity commands, and actual velocity, and using the above equations relating torque commands to velocity error. According to another aspect and as discussed above, the other feedforward parameters can also be tuned, such as by using the process of FIG. 3, and equations relating the sum of the torques to acceleration (angular or linear, depending upon motor type).

B. Digital Interface Between the CNC and the Servo

The implementation of feedforward auto tuning on a hardware platform that involves a digital servo interface is shown in FIG. 10. As can be understood from comparison of FIGS. 8 and 10, the implementation is very similar to the case for the analog servo interface.

In the implementation shown in FIG. 10, the CNC 100 incorporates a Workstation process 102, real time process 104, and servo process 164. Each of these processes may be executed on individual CPUs, a single CPU, or a combination of CPUs. As in the analog-interfaced system, the servo process 164 typically executes more often (at a smaller time interval) than the real time process. As noted above, the servo process time interval is referred to as the minor update interval. The servo process 164 controls the position, velocity, and torque of each axis by obtaining measurements of motor currents and motor shaft position. The primary output of the servo process 164 is a three phase voltage command which is fed to a PWM amplifier 152, which, in the embodiment illustrated in FIG. 10, is a separate hardware device. The once-per-minor-update-interval variables of torque command and velocity feedback are subjected to a process of anti-alias filtering and resampling 142. The re-sampled data is delivered to the real time processor's measurement data storage area 168 through a mechanism such as a shared memory interface. This data can then be transferred to measurement data storage area 110, in the workstation 102, and utilized by the inventive feedforward auto-tuning parameter estimation program 120, to estimate/calculate/tune the feedforward gains $G_{VFF}$, $G_{AFF}$, $G_{COUL}$, $G_{CONST}$, and $G_{VISC}$, such as according to the process of FIG. 3.

Thus, the key differences between the analog interfaced system of FIG. 8 and the digital interfaced system of FIG. 10, other than the interface used, are as follows. In the digital system, the velocity and torque commands are applied simultaneously from the realtime process 104 of the CNC 100 to the servo 164, while in the analog system, only a velocity command is applied to the servo 106. As such, the torque feedforward commands from the CNC 100 in the analog system of FIG. 8 must be converted to velocity feedforwards, as described above, through the use of the compensator parameters $K_p$ and $K_i$. These parameters can be estimated according to the automatic tuning program of the present invention, as also disclosed above.

Another difference between the two systems is that measurement data from between the CNC 100 and the servo drive 106 of the analog-interfaced system of FIG. 8 needs to be transferred via communications interfaces 108 and 140, while, in the digital system of FIG. 10, no such interface is required, as the CNC and servo are already digitally connected.

Although one embodiment of the present invention has been presented wherein a value for a compensation parameter(s) is determined by modeling behavior (e.g., the behavior of drive dynamics), it should be appreciated that a value of such a parameter can be determined by other methods. For example, an optimum value of a compensation parameter can be determined via iteration techniques. Such an embodiment might be useful where, for example, behavior is difficult to model.

For example, in one embodiment of the present invention, a field bus (e.g., complying with the PROFIBUS standard) might be used to interface a position command generator and a feedforward command generator (e.g., as embodied in a CNC) with a controller, such as a servo drive (e.g., instead of an analog or digital interface). In a typical analog interface, such as that illustrated in FIG. 8, a CNC might send a servo drive an analog velocity command and could receive an encoder waveform. By comparison, in a typical field bus interface, a CNC might send a servo drive a digital velocity command and could receive a digital feedback signal which is a processed form of an encoder waveform. As can be understood, a time delay is introduced because of the processing needed to produce the digital feedback signal. Additional delays can also be introduced because of the communication time between the CNC issuing a command and the drive responding to the command.

In an embodiment wherein a feedforward command is applied, for example, it can be beneficial to compensate for such a time delay. Accordingly, in one such embodiment, a time-shift parameter is utilized to tune a time-shifted relationship between a velocity feedforward command and a position command. As the time-shift relationship can be difficult to model, however, one embodiment of the present invention utilizes the aforementioned iterative technique to determine an optimum value for the time-shift parameter.

According to one such exemplary embodiment, optimum values are first determined for feedforward parameters, other than the time-shift parameter, that will be used in generating a feedforward command. For example, the techniques otherwise presented for proposing values for parameters such as an acceleration feedforward gain, Coulomb friction feedforward gain, viscous friction feedforward gain, constant offset feedforward gain, proportional gain, inertia and/or integral gain could be used to determine values for such parameters. According to an exemplary embodiment, the optimum values proposed for such feedforward parameters are used in the generation of feedforward commands used in the exemplary tuning operation. In one embodiment of the present invention, such optimum values are used during the tuning operation even if a user decides not to use one or more of the proposed optimum values during the normal operation of the control system (e.g., a proposed value is displayed to a user during a portion of the tuning operation directed towards that parameter and the user rejects the proposed value, such as via feedforward GUI 112). In such an embodiment, the permanent values can be restored after the tuning operation is complete.

In one embodiment of the present invention, the optimum values can be written to, for example, a configuration data storage area, such as configuration data storage area 122 shown in FIG. 8. A starting value for the time-shift parameter can also he written to the configuration data storage area.

An actuator whose motion is controlled based on the position commands and feed forward commands is moved in response to a test motion routine (e.g., an excitation part program), wherein the feedforward command is generated based on the aforementioned parameters. According to one embodiment of the present invention, the excitation part program is generated in conjunction with user-defined parameters such as, for example, starting point, stopping point, and duration of the test motion. As can be appreciated, such parameters could, for example, be received as input from a user via a GUI, such as feedforward GUI 112.

For example, the excitation part program can comprise one that results in the creation of position commands according to a sinusoidal waveform having a varied frequency (e.g., gradually increasing), which will be referred to hereinafter as a chirp input. According to one embodiment, the chirp input also has varying amplitude (e.g., gradually increasing and then gradually decreasing). One advantage of an excitation part program according to such an illustrative embodiment can be that it represents a wide range of commands that fully excites the system.

The actual motion (e.g., as reflected in operation data recorded during the motion) and the commanded motion can be compared to determine any error (e.g., a following error). In one embodiment, the RMS error can be determined for the particular combination of parameters used to generate any feedforward commands applied during the test motion. Although an exemplary embodiment is presented herein wherein RMS error is used to quantify error, other methods of quantifying error can also be used.

A new value for the time-shift parameter is then written to the configuration data storage area and the test motion is re-run. The RMS error can be determined for the new combination and compared with that of the original combination. Based on the comparison, yet another value of the parameter can be identified. In an exemplary embodiment, a user can be presented with a graphical representation of the test motion and/or the error (e.g., actual and/or RMS) for each combination.

According to an exemplary embodiment of the present invention, minimization algorithm techniques can be used to analyze actual motion in response to the test motion routine for each combination of parameters and to iteratively identify new parameter values For example, it has been discovered that resultant actuator motion generally takes the form of a function which can be analyzed using techniques of algorithms such as the golden section search algorithm, as described in Numerical Recipes. Using such techniques, values for a parameter such as the time-shift parameter can be iteratively identified and applied in test motions to ultimately determine an optimum value for the parameter. According to one exemplary embodiment, a user can be presented with an opportunity to accept the determined optimum value for the parameter (e.g. via feedforward GUI 112).

Figure 13:
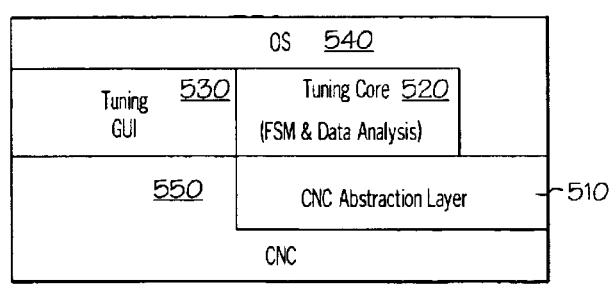
FIG. 13 is a diagram illustrating an architecture which can be used in an embodiment of the present invention as embodied in software.

One embodiment of the present invention might be implemented in software using the exemplary architecture depicted in FIG. 13. According to such an embodiment, the software (referred to hereinafter as tuning software by example) is based on a layered approach wherein an interface (abstraction layer 510) is utilized to insulate, for example, a core 520 of the tuning software (e.g., the core could represent that portion of the software where data analysis and optimum values for parameters are determined) from the particular requirements of, for example, a CNC 550, that might want to utilize the tuning software. One advantage of such an embodiment could include minimizing development costs by restricting development to that of appropriate abstraction layers for each type of CNC, for example.

For example, tuning core 520 might require functionality for tasks such as opening a program on the CNC, loading a program on the CNC, identifying when a point in a program running on the CNC has passed a certain point, identifying information about the CNC, etc. Meanwhile, abstraction layer 510 can provide control-specific implementation of these tasks that might be used by core 520. In the illustrated embodiment, tuning core 520 runs within an operating system 540 (e.g., a Microsoft Windows operation system) on a computing device. As can be appreciated, in additional embodiments, tuning core 520 could also be isolated from such an operating system.

In an exemplary embodiment, tuning core 520 utilizes an interface with a user (e.g., a human operator). In one embodiment, for example, a user interface 530 is developed as a separate layer having direct access to CNC 550. One advantage of such an embodiment might include allowing user interface 530 to emulate interfaces typically associated with the CNC being utilized. As can be appreciated, user interface 530 might also access CNC 550 by way of tuning core 520 and abstraction layer 510. Moreover, although not specifically shown in FIG. 13, an interface (e.g., an API) might also exist between user interface 530 and tuning core 520.

According to one embodiment of the present invention, an optimum value of a parameter can be determined using an iterative technique in response to a request by a GUI, such as feedforward GUI 112. In an embodiment utilizing the aforementioned architecture, for example, a core layer might include the functionality for determining such a value in response to a request by a GUI. For example, the core layer might implement a finite state machine (FSM) for determining such a value, wherein the GUI can issue a request that might be translated into stimulus conditions for the state machine.

Figure 14:
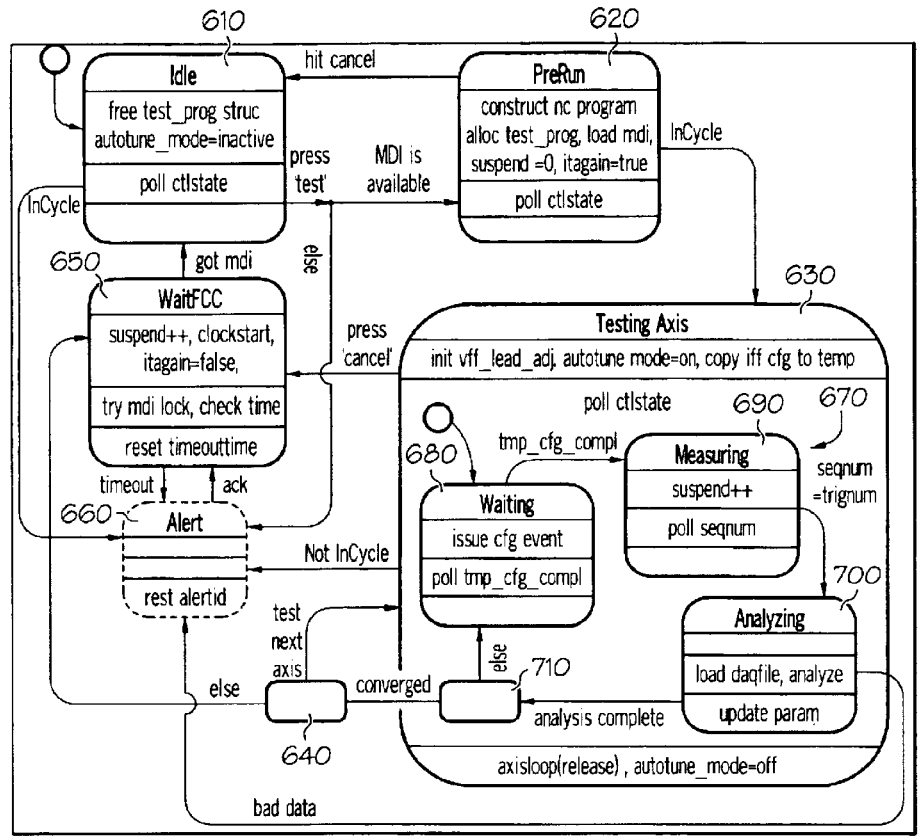
FIG. 14 is a finite state machine diagram, illustrating an iterative technique for determining an optimum parameter value according to one embodiment of the present invention.

An exemplary state machine 600 for servicing such requests is depicted in FIG. 14. In the illustrated embodiment, state machine 600 is described utilizing a series of boxes and arrows. Each box represents a state and is potentially comprised of four areas. The top area in each box represents the name of the state represented by that box. The second area from the top represents an action to perform upon entering that state (e.g., when a system changes to that state). Meanwhile, the third area from the top represents an activity of that state (i.e., the things done while in that state). Finally, the fourth area from the top represents what is done upon exiting that state.

Each arrow represents a state transition, where the head of the arrow identifies to what is being transitioned. The tail of the arrow represents from what is being transitioned. The text accompanying each arrow identifies the stimulus condition that causes the transition.

Referring now to the exemplary embodiment illustrated in FIG. 14, iterative FSM 600 can include an idle state 610, a pre-run state 620, and a testing axis state 630. Iterative FSM 600 might also include an alert state 660, which might be advantageously included in an embodiment where it is desirable to handle error conditions that may arise.

According to one such embodiment of the present invention, idle state 610 could be a default state. For example, upon executing the FSM, idle state 610 is entered and state machine 600 waits for a request from a user interface, for example. According to one embodiment, while in idle state 610, state machine 600 polls for a control state (e.g., start test, in cycle). For example, a request such as start test may be generated by a user interface (e.g., through an interface to a core) in response to a user pressing a test button provided by the user interface.

Upon identifying that a request has been made to start a test, the state machine transitions out of idle state and into pre-run state 620. In an exemplary embodiment, before transitioning into pre-run state 620, however, the state machine checks to see whether a test motion routine (e.g., an excitation part program) can be loaded (e.g., into an manual data interface or "MDI"). If the routine can be loaded, transitioning to pre-run state 620 can be completed. If the routine cannot be loaded (e.g., something else has possession of it), alert state 660 can be entered. Alert state 660 might also be entered if, during idle state 610, it is detected (e.g., by polling a control state) that the control is in cycle (which might mean that a part program is running).

Upon entering prerun state 620, a test motion routine (referred to hereinafter by example as a part program, such as one used to cause the aforementioned chirp motion) is constructed. In an exemplary embodiment, such a part program will include loops that allow it to iterate according to techniques previously described. Such a part program can be generated based on an axis selected for the test (e.g., selected by the user) and/or other test setup parameters (e.g., start, stop, and duration).

While in pre-run state 620, a control state can again be polled. For example, a control state can be polled to determine if a user has indicated that the test motion should start (which could be in response to a message to do the same that is generated while the state machine is in pre-run state). Upon determining that the user desires the test motion to start (e.g., a detected control state of in cycle), state machine 600 can transfer to testing axis state 630.

Upon entering testing axis state 630, an initial value is determined for the parameter being optimized. In the example illustrated in FIG. 14, the parameter being optimized is shown as the time-shift parameter (identified in the figure as velocity feedforward lead adjustment or vff_lead_adj). In an exemplary embodiment, an indication is also made that any optimum values determined for other compensation parameters (e.g., feedforward compensation parameters) are also to be used in controlling the test motion. For example, upon entering testing axis state 630, feedforward compensation might be temporarily turned on and configured to use the values proposed for other feedforward parameters as previously described herein. If no new values for such parameters have yet been proposed, standard values (e.g., those existing in a database) can be used.

Testing axis state 630 might include a nested state machine 670 that is entered while in testing axis state. Nested state machine 670 might include a waiting state 680, a measuring state 690, an analyzing state 700, and a convergence test state 710. Thus, according to the illustrated embodiment, after entering testing axis state 630, waiting state 680 is entered.

Upon entering waiting state 680, a configuration event can be issued. For example, a configuration event can be issued that tells the control (e.g., a real-time process on the control) to implement the aforementioned parameters. While in the waiting state 680, state machine 600 polls to determine whether the temporary configuration has completed (e.g., whether a real time process was able to actually go through the process of getting the new values).

Once the temporary configuration has completed, state machine 600 can transition to measuring state 690. According to an exemplary embodiment, when a part program is executed, the program will be in cycle but will be suspended (e.g., by immediately going to a suspension state in the program). Motion is therefore not actuated until the part program is released from being suspended. Thus, according to one such embodiment, upon entering measuring state 690, the part program is released from a suspended state. For example, the part program might be released by incrementing a semaphore (e.g., the semaphore suspend). Accordingly, motion begins.

While in measuring state 690, a determination is made as to whether the part program has reached a certain point in its execution that indicates that motion has completed. For example, state machine 600 might check for an indexed event. In the A2100 control of Siemens, one approach might include checking a sequence number (e.g., polling seqnum). Moreover, in an exemplary embodiment, a suspend block is included in the part program after the motion block. According to such an embodiment, after motion completes, the part program is still running, but is suspended.

Upon determining that motion has completed, the state machine can transition to analyzing state 700. According to an exemplary embodiment, the part program includes commands to store data such as following error in the command position. While in analyzing state 700, state machine 600 attempts to load such data (e.g., via a data acquisition file). As it can take some amount of time after the motion is completed before such data is available, one embodiment of the present invention attempts to periodically load the data.

According to one embodiment of the present invention, state machine 600 might transition out of analyzing state 700 if it has been determined that there is something wrong with the acquired data. For example, in such a case, state machine 600 can transition to alert state 660. In an exemplary embodiment, state machine 600 might also transition out of analyzing state 700 if a time out condition occurs (e.g., a certain period of time has elapsed since entering analyzing state, which might indicate that there might be something wrong with, for example, a file system). In such a case, state machine 600 might transition to alert state 660, for example.

Referring, however, to a situation wherein no such error conditions exist, once the data is loaded, state machine 600 can cause it to be analyzed, such as to determine an RMS following error value for that execution. According to one embodiment, an indication of the completion of the analysis is generated and state machine 600 transitions to convergence test state 710. Upon exiting analyzing state 700, however, a determination is made as to what is the current best value for the parameter being optimized. A potential value of the parameter can also be determined for analysis, such as through a technique based on the previously mentioned golden section search algorithm.

At convergence test state 710, state machine 600 can check for convergence. For example, state machine 600 might attempt to identify, for example, two second best values of the parameter being optimized. In an exemplary embodiment, a determination can be made as to whether there has been a significant percentage change between the second best values and the current best value. It can also be determined whether the values are so close together that there would be substantially no difference between using one over the others. If, for example, there has not been a significant percentage change and/or the values are close enough together that there would be no significant difference, then convergence can be found.

If convergence is not found, state machine 600 can transition back to waiting state 680 and the process iterated using the potential value of the parameter in the configuration of the control. For example, upon re-entering waiting state 680, a new configuration event can be issued to pick up the potential value of the parameter being optimized. The determination of the potential value can take place at a number of different states shown in exemplary state machine 600. For example, as previously discussed, the potential value can be determined in relation (e.g., while in or at exit) to analyzing state 700. In another embodiment, the potential value can be determined in relation (e.g., on entry, while in, or on exit) to convergence test state 710. Accordingly, nested state machine 670 can be utilized to iteratively determine an optimum value of the parameter.

In an exemplary embodiment, a control state is also polled while in testing axis state 630. A control state can be polled, for example, to make sure that the part program is still in cycle. If the part program is not in cycle, the state machine can be transitioned to alert state 660, for example.

Other error conditions might include, for example, exceeding a maximum number of iterations in nested state machine 670. According to one embodiment of the present invention, upon making such a determination, even though convergence has not been determined, the best value of the parameter might be identified, and an indication might be given that convergence was not determined and/or a reason as to why convergence was not determined (e.g., the maximum number of iterations was exceeded).

In one embodiment of the present invention, the test can be cancelled. Accordingly, state machine 600 might include the ability to transition to a waiting for cycle complete (WaitFCC) state 650 in response to such an action. For example, WaitFCC state 650 can be used to wait for completion of program execution. According to one exemplary embodiment, for example, upon entering WaitFCC state 650, semaphores can be released until a part program exits all of its loops. Moreover, if the test was cancelled after at least one potential value for the parameter being optimized was determined via nested state machine 670, that value can be identified for potential use (e.g., it might be identified in conjunction with an indication that convergence was not determined).

Referring, however, to a situation in which convergence was determined, state machine 600 could then transition to a next axis state 640. According to such an embodiment, if it is desired to test another axis, a value for the axis could be incremented and state machine 600 could again transition to testing axis state 630. If no other axis is to be tested, state machine 600 can transition to WaitFCC state 650. As previously stated, while in WaitFCC state 650, state machine 600 can wait for part program execution to complete. On part program completion, state machine 600 can transition back to idle state 610.

The foregoing description of the preferred embodiments of the invention has been presented for purposes of illustration and description only. It is not intended to be exhaustive or to limit the invention to the precise form disclosed, and modifications and variations are possible in light of the above teachings. While a number of preferred equations and models have been described, it should be understood that variations and alternatives could be utilized without departing from the scope of the invention. For example, as discussed, the model disclosed could be modified to incorporate position dependent Coulomb friction, static friction, and machine compliance, and feedforward gains to compensate for these phenomena could be thereby calculated. As another example, the torque command measurements could be replaced by motor current measurements without departing form the scope of the invention. Furthermore, the concepts of the invention can be utilized to tune or estimate a number of parameters, such as, for example, the parameters $K_p$ and $K_i$, which allow for an implementation of an analog interface between the CNC and servo. In addition, it should be understood that the invention can be used in a variety of motion control systems, and should not be limited to machine tool or CNC applications.

Thus, it should be understood that the embodiments and examples have been chosen and described in order to illustrate the principals of the invention and its practical application to thereby enable one of ordinary skill in the art to best utilize the invention in various embodiments and with various modifications as are suited for particular uses contemplated. Accordingly, it is intended that the scope of the invention be defined by the claims appended hereto.

I claim:

1. A computer-implemented method for automatically tuning a feedforward compensation parameter in a motion control system, the method comprising:
   a) determining an initial value of the feedforward compensation parameter;
   b) commanding an initial movement of an actuator according to a test motion routine, wherein the initial value of the parameter is used in the control of the actuator;
   c) determining error associated with the initial movement;
   d) determining a potential value of the feedforward compensation parameter;
   e) commanding a movement of the actuator according to the test motion routine, wherein the potential value of the parameter is used in the control of the actuator;
   f) determining error associated with the movement commanded in act e);

g) comparing the errors associated with the movements;
h) based on the act of comparing the errors, selecting one of the values as a current best value; and
i) repeating acts d)–h) until the current best value is an optimum value, wherein the act of comparing the errors associated with the movements comprises comparing the errors associated with at least two of the movements;
wherein the feedforward compensation parameter comprises at least one parameter selected from the group consisting of an acceleration feedforward gain, a Coulomb friction feedforward gain, a viscous friction feedforward gain and a constant offset feedforward gain.

2. A method according to claim 1, wherein the feedforward compensation parameter being tuned is one of a plurality of feedforward compensation parameters comprising other feedforward compensation parameters, further comprising using optimum values determined for the other feedforward compensation parameters in the control of the actuator for the commanded movements.

3. A method according to claim 2, wherein the other feedforward compensation parameters being tuned comprise at least parameter selected from the group consisting of a time-shift parameter, a proportional gain, and an integral gain.

4. A method according to claim 2, further comprising determining the optimum values for the other feedforward compensation parameters prior to commanding any of the movements.

5. A method according to claim 1, wherein the test motion routine is associated with a sinusoidal waveform.

6. A method according to claim 1, wherein the acts of determining error comprises determining a following error.

7. A method according to claim 1, wherein the act of comparing the errors comprises comparing an average of the root means squared value of each of the errors.

8. A method according to claim 1, wherein the act of determining a potential value for the feedforward compensation parameter comprises using a technique based on a minimization algorithm to determine the potential value.

9. A method according to claim 1, wherein the act of determining whether the current best value is the optimum value comprises:
a) identifying which of the values is a second best value;
b) determining whether there is a percentage change between the second best value and the current best value.

10. A method according to claim 1, wherein the act of determining whether the current best value is the optimum value comprises:
a) identifying which of the values is a second best value; and
b) determining whether there would be any difference between using the current best value and the second best value.

11. A computer-implemented motion control system comprising:
a) a position command generator adapted to produce position commands;
b) a feedforward command generator adapted to produce feedforward commands based upon feedforward compensation parameters, wherein one of the feedforward compensation parameters comprises at least one parameter selected from the group consisting of an acceleration feedforward gain, a Coulomb friction feedforward gain, a viscous friction feedforward gain and a constant offset feedforward gain;
d) a controller adapted to communicate with an actuator, the position command generator, and the feedforward command generator, and adapted to control the motion of the actuator based upon the position commands and the feedforward commands; and
e) a feedforward tuning unit adapted to:
i) determine an initial value of the feedforward compensation parameter,
ii) cause the position command generator to produce position commands according to a test motion routine, wherein the initial value of the feedforward compensation parameter is used in the control of the actuator and the actuator undergoes an initial movement;
iii) determine error associated with the initial movement;
iv) determine a potential value of the feedforward compensation parameter;
v) cause the position command generator to produce position commands according to the test motion routine, wherein the potential value of the feedforward compensation parameter is used in the control of the actuator and the actuator undergoes movement;
vi) determine error associated with the movement wherein the potential value was used in the control of the actuator;
vii) compare the errors associated with the movements;
viii) select one of the values as a current best value based on the comparison; and
ix) repeat actions in iv)–viii) until the current best value is an optimum value, wherein the feedforward tuning unit compares the errors associated with at least two of the movements.

12. A motion control system according to claim 11, wherein the feedforward tuning unit is adapted to communicate with at least one of the actuator, the controller, the position command generator, and the feedforward command generator via a data communication network and in compliance with a communications protocol.

13. A motion control system according to claim 12, wherein the communications protocol is a hypertext transfer protocol.

14. A motion control system according to claim 11, wherein the position command generator, the feedforward command generator, and the feedforward tuning unit are incorporated within a computer numerical control unit and the controller comprises a servocontroller.

15. A motion control system according to claim 11, wherein the feedforward tuning unit comprises a finite state machine.

16. A computer readable medium comprising instructions capable of implementing a method of running a feedforward compensation parameter in a motion control system, the method comprising:
a) determining an initial value of the feedforward compensation parameter;
b) commanding an initial movement of an actuator according to a test motion routine, wherein the initial value of the parameter is used in the control of the actuator;
c) determining error associated with the initial movement;
d) determining a potential value of the feedforward compensation parameter;
e) commanding a movement of the actuator according to the test motion routine, wherein the potential value of the parameter is used in the control of the actuator;

f) determining error associated with the movement commanded in act e);

g) comparing the errors associated with the movements;

h) based on the act of comparing the errors, selecting one of the values as a current best value; and i) repeating acts d)–h) until the current best value is an optimum value, wherein the act of comparing the errors associated with the movements comprises comparing the errors associated with at least two of the movements;

wherein the feedforward compensation parameter comprises at least one parameter selected from the group consisting of an acceleration feedforward gain, a Coulomb friction feedforward gain, a viscous friction feedforward gain and a constant offset feedforward gain.

17. A computer-implemented motion control system comprising:

a) a position command generator adapted to produce position commands;

b) a feedforward command generator adapted to produce feedforward commands based upon feedforward compensation parameters, wherein one of the feedforward compensation parameters comprises a time-shift compensation parameter that compensates for a time-shifted relationship between the position command and the feedforward command;

d) a controller adapted to communicate with an actuator, the position command generator, and the feedforward command generator, and adapted to control the motion of the actuator based upon the position commands and the feedforward commands; and e) a feedforward tuning unit adapted to:

i) determine an initial value of the time-shift compensation parameter;

ii) cause the position command generator to produce position commands according to a test motion routine, wherein the initial value of the time-shift compensation parameter is used in the control of the actuator and the actuator undergoes an initial movement;

iii) determine error associated with the initial movement;

iv) determine a potential value of the time-shift compensation parameter;

v) cause the position command generator to produce position commands according to the test motion routine, wherein the potential value of the time-shift compensation parameter is used in the control of the actuator and the actuator undergoes movement;

vi) determine error associated with the movement wherein the potential value was used in the control of the actuator, vii) compare the errors associated with the movements;

viii) select one of the values as a current best value based on the comparison; and ix) repeat actions in iv)–viii) until the current best value is an optimum value, wherein the feedforward tuning unit compares the errors associated with at least two of the movements; and wherein the feedforward tuning unit comprises a finite state machine.

* * * * *